Dec. 7, 1965 R. K. BOOHER 3,222,505

DIVISION APPARATUS

Filed Nov. 20, 1961 9 Sheets-Sheet 1

INVENTOR.
ROBERT K. BOOHER

BY

Allan Rothenberg

ATTORNEY

Dec. 7, 1965 R. K. BOOHER 3,222,505

DIVISION APPARATUS

Filed Nov. 20, 1961 9 Sheets-Sheet 2

INVENTOR.
ROBERT K. BOOHER

BY

Allan Rothenberg

ATTORNEY

INVENTOR.
ROBERT K. BOOHER
BY
Allan Rothenberg
ATTORNEY

INVENTOR.
ROBERT K. BOOHER
BY Allan Rothenberg
ATTORNEY

INVENTOR.
ROBERT K. BOOHER
BY
Allan Rothenberg
ATTORNEY

Dec. 7, 1965 R. K. BOOHER 3,222,505

DIVISION APPARATUS

Filed Nov. 20, 1961 9 Sheets-Sheet 6

INVENTOR.
ROBERT K. BOOHER

BY Allan Rothenberg

ATTORNEY

Dec. 7, 1965 R. K. BOOHER 3,222,505

DIVISION APPARATUS

Filed Nov. 20, 1961 9 Sheets-Sheet 7

INVENTOR.
ROBERT K. BOOHER

BY [signature]

ATTORNEY

Dec. 7, 1965 R. K. BOOHER 3,222,505
DIVISION APPARATUS
Filed Nov. 20, 1961 9 Sheets-Sheet 8

| | As | A7 | A6 | A3 | A4 | A3 | A2 | A1 | Ao | Ax | Lp | Cr6 | Cr5 | Ls | L7 | L6 | L5 | L4 | L3 | L2 | L1 | Lo | Lx |
|---|---|---|---|---|---|---|---|---|---|---|---|---|---|---|---|---|---|---|---|---|---|---|---|
| START | 0 | 1 | 0 | 1 | 0 | 0 | 0 | 1 | X | X | X | X | X | 1 | 1 | 1 | 0 | 1 | 1 | 0 | 0 | X | X |
| W1 | 0 | 1 | 0 | 1 | 0 | 0 | 0 | 1 | X | X | 0 | 1 | 1 | 1 | 0 | 1 | 1 | 0 | X | X | X | X | X |
| W2 | 0 | 1 | 1 | 1 | 0 | 0 | 0 | 1 | X | 0 | 0 | 1 | 0 | 1 | 1 | 0 | 0 | X | X | 1 | 0 | 0 | 1 |
| W3 | 0 | 1 | 0 | 0 | 0 | 1 | 0 | 0 | 0 | 0 | 0 | 1 | 1 | 0 | 0 | X | X | 1 | 0 | 1 | 1 | 0 | 0 |
| W4 | 1 | 0 | 0 | 1 | 0 | 1 | 0 | 1 | 1 | 0 | 0 | 0 | 0 | 0 | X | 1 | 0 | 1 | 1 | 0 | 0 | 0 | 1 |
| W5 | 1 | 0 | 0 | 1 | 0 | 1 | 0 | 1 | 0 | 1 | 0 | 0 | X | 1 | 0 | 1 | 1 | 0 | 0 | 0 | 1 | 0 | 0 |
| W6 | 0 | 1 | 1 | 0 | 0 | 0 | 1 | 0 | | | 0 | 1 | 0 | 0 | 0 | 0 | 0 | 0 | 0 | 0 | 0 | 0 | 1 |

FIG. 10

| O2 PREVIOUS OPERATION | Cr4 PREVIOUS REMAIN SIGN BIT | C5 DIVISOR SIGN BIT | Ob6/Ob4 CARRY / BORROW | DIVISOR NEW REMAINDER | C6 OPERATION INDICATED |
|---|---|---|---|---|---|
| + | 0 | 1 | YES | DIFF | + |
| + | 0 | 1 | NO | SAME | — |
| | | | | | |
| + | 1 | 0 | YES | SAME | — |
| + | 1 | 0 | NO | DIFF | + |
| | | | | | |
| — | 1 | 1 | YES | SAME | — |
| — | 1 | 1 | NO | DIFF | + |
| | | | | | |
| — | 0 | 0 | YES | DIFF | + |
| — | 0 | 0 | NO | SAME | — |

FIG. 13

INVENTOR.
ROBERT K. BOOHER
BY
Allan Rothenberg
ATTORNEY

INVENTOR.
ROBERT K. BOOHER
BY
Allan Rothenberg
ATTORNEY

United States Patent Office 3,222,505
Patented Dec. 7, 1965

3,222,505
DIVISION APPARATUS

Robert K. Booher, Downey, Calif., assignor to North American Aviation, Inc.

Filed Nov. 20, 1961, Ser. No. 153,541
17 Claims. (Cl. 235—167)

This invention is concerned with a digital dividing apparatus and particularly relates to a serial machine which is capable of performing division in a relatively shortened time period.

A serial digital computer generally performs a division computation step by step. In one form of such division, the divisor is subtracted from the dividend to obtain a first remainder. If no over-borrow occurs on such subtraction, the divisor is shifted right with respect to the remainder and again subtracted. If an over-borrow occurs, the divisor is added back to the dividend or previously-obtained remainder, then shifted right with respect to the dividend and subtracted again. The quotient digits are determined by the nature of the individual computation of the successive steps. If no over-borrow occurs, the quotient digit for a particular step is one, whereas if an over-borrow occurs, the corresponding quotient digit is a zero. In the method of division known as the Von Neuman or non-restoring division, computation steps are saved by avoiding the operation of adding back upon existence of an over-borrow. If an over-borrow should occur when subtracting, instead of adding back, one simply shifts the divisor right with respect to the remainder and then adds the divisor to such remainder. Again the digits of the quotient are one and zero respectively if an over-borrow does not or does occur.

It will be observed that when dividing with a serial machine wherein a full cycle of a circulating register or one full word time is required to perform an addition or a complete subtraction, that only one computation can occur during each step of the division. This is so since in either of the two methods of division mentioned above, the results of the previous computation determine the nature, whether addition or subtraction, of the next computation. Generally the serial machine must complete a a given subtraction or addition before it can be determined whether or not there is an over-borrow, the existence of which will determine whether or not the next step in the computation will comprise addition or subtraction. It will be apparent that the speed of the division operation is limited. One complete step or word time is required for each order of the quotient which is desired. Accordingly, a major object of the present invention is to provide a method and apparatus for performing a serial division by simultaneously executing a plurality of additions or subtractions during each step of the operation.

In a computer which is capable of performing both multiplication and division, it is desirable to time share the necessary structure, employing to the grestest possible extent the same hardware components and logic for performing both division and multiplication since the two operations are never carried out simultaneously. Accordingly, it is a further object of this invention to perform division by the use of structure which can be employed with a minimum of change to achieve a multiplication.

Many computing machines will represent and operate upon a negative number which is indicated by a sign bit and an absolute value of the number. With such a representation, the results of a given computation will frequently result in a number presented in complement form. Before storing such result, it must be recomplemented to place it in proper form for rapid read-out, or for being operated upon by a subsequent operation. Consequently for each operation such as addition or subtraction, an additional word time is required in order to provide for such recomplementing. Thus a further object of the present invention is to increase the speed of operation of a serial computer by performing operations upon negative numbers represented in two's complement form.

Depending upon the particular value of a given divisor or dividend for a given division operation, a remainder may or may not exist after obtaining all desired orders of the quotient. Consequently some method of rounding the quotient is generally employed. Such methods are most accurate which take into account the quotient digit of next lower order. However, such an operation generally requires additional time for determining such next lower order quotient digit. In the absence of information concerning the next lower order digits of the quotient, any rounding method is inherently of a haphazard nature. Accordingly, another object of the present invention is to perform a more accurate rounding of the result without requirement of extra time.

In carrying out the principles of this invention, according to a preferred embodiment thereof, step by step non-restoring binary division is achieved by employing structure which obtains a plurality of successive remainders in each of a number of successive steps of the division by means of a plurality of successive computations in each step. These computations comprise either addition or subtraction of the divisor to or from successive remainders. Each such computation determines a digit of given order of the quotient. There is provided an indicator means responsive to the last obtained remainder of one step of the operation for selecting the nature, whether addition or subtraction, of the first computation of the next step. There is also provided means for comparing the divisor with the last obtained remainder of one step and selecting according to such comparison the nature, whether addition or subtraction, of the second computation of the next step. In effect the comparison means operates in any one step to look ahead and determine the result of the first computation of the succeeding step in order to provide the necessary choice of either addition or subtraction on the second computation of such succeeding step. Since this look-ahead comparison means provides an early indicaiton of the next digit, it is conveniently utilized in the step of the operation which determines the lowest order quotient digit to also determine the quotient digit of the order lower than the lowest order actually required. In the light of this information, it is possible to round the quotient by adding a single unit to the lowest order of the actually obtained quotient if the next digit (not registered but only indicated) is a one and leave the quotient unchanged if such look-ahead quotient digit is a zero. The rounding is performed by the comparison means which is operable during the step in which the least significant quotient digit is determined to compare the divisor with the remainder obtained during such step and provide an indication of the quotient digit which would be determined by yet a further step of the division. The operation of this comparison means in this step of the operation is employed to selectively combine a single unit with the lowest order digit of the quotient.

In the non-restoring division method employed in the described binary machine, negative numbers are handled in two's complement form and negative quotients are initially obtained in one's complement form. Accordingly, such one's complement must be converted to the chosen two's complement representation. This conversion operation is combined with the round operation so that the two are simply handled by a one-input adder.

Except when rounding the quotient, the described apparatus provides a true remainder of sign like that of the divisor. This operation is achieved during the last word time either by addition without shift or by no operation at all.

While the preferred embodiment to be described herein comprises a machine employing and handling both positive and negative numbers, it will be appreciated that the principles of the invention are readily applicable to a machine handling only positive or only negative numbers. In such a situation, it is necessary only to look to the sign of the previous remainder in order to obtain an indication of the nature of the first computation of the next step in a non-restoring division which performs plural computations for each step. For an indication of the nature of the second computation of each step, it would be necessary in such a machine handling only positive or only negative numbers, to look to the sign of the previous remainder and also to a comparison of the divisor with such previous remainder. However, since negative numbers are handled as two's complement in the machine described as a preferred embodiment of the present invention, division of negative and positive numbers and mixtures thereof is possible. Accordingly, it is necessary in such an arrangement to look both to the sign of the previous remainder and to the sign of the divisor in order to determine the nature of the first computation of a given step. For determining the nature of the second computation of a given step, there is required information concerning the comparison of the divisor and the previous remainder and both signs of previous remainder and divisor.

In a machine of the type described herein, the non-restoring division rule is to perform that computation which diminishes the magnitude of the previous remainder. Accordingly, if the sign of the divisor is the same as that of the remainder with which it is to be combined, a subtraction is required, whereas if the signs are different, addition is required. This rule results in a continuing decrease of the magnitude of the remainder with the nature of each step which provides such decrease (whether addition or subtraction) determining the nature of the corresponding quotient digit. If subtraction occurs, the quotient digit indicated is a one whereas if addition occurs, the indicated quotient digit is a zero.

The embodiment of the invention described herein is a companion to the multiplication apparatus described in my co-pending application for Multiplication Apparatus filed Oct. 23, 1961, Serial No. 146,704. Accordingly, the disclosed apparatus employs much of the same logic and much of the same components as are described in such co-pending application. While such co-pending application teaches multiplication two bits at a time and the instant embodiment of division apparatus employes a division which occurs two bits for each word time, it will be readily appreciated that division three bits for each word time or more than three bits for each word time can be achieved in the light of principles of the present invention by cascading the look-ahead comparison operation. However, the additional time saved by a third or more computation for each word time may not be warranted in view of the relatively great increase in the amount of hardware and logic required for achieving division at a rate of more than two bits per word time.

It will be seen that a primary object of the present invention is to provide a serial machine for achieving a division at increased speed.

Still another object of this invention is to perform division in a number of word times substantially less than the number of orders required of the desired quotient.

A further object is to provide a rapid non-restoring division of both positive and negative numbers.

Still another object is to provide an improved round operation in a machine handling negative numbers.

Still another object of this invention is to provide an improved and simplified handling of the remainder in a non-restoring division.

These and other objects of the invention will become apparent in the light of the following detailed description when taken in connection with the accompanying drawings wherein:

FIG. 1 comprises a block diagram of registers and timing structure employed in a preferred embodiment of the invention;

Figure 8:
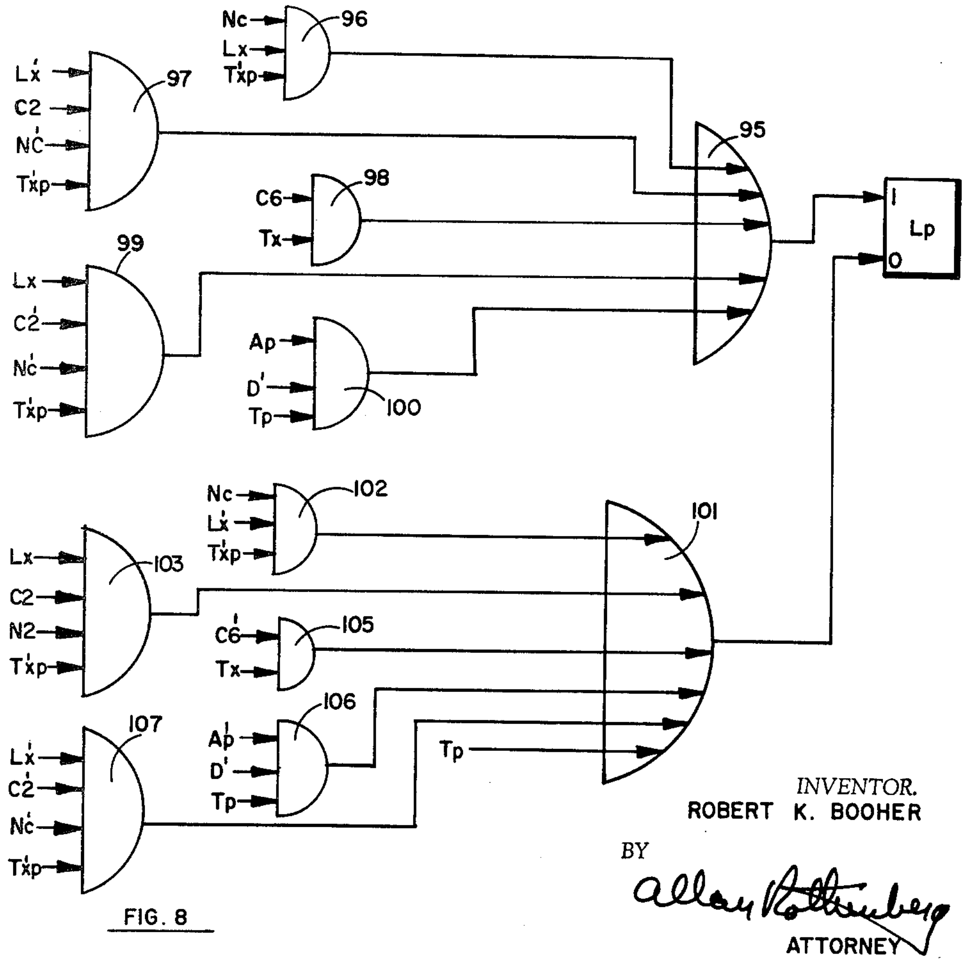
Figure 4:
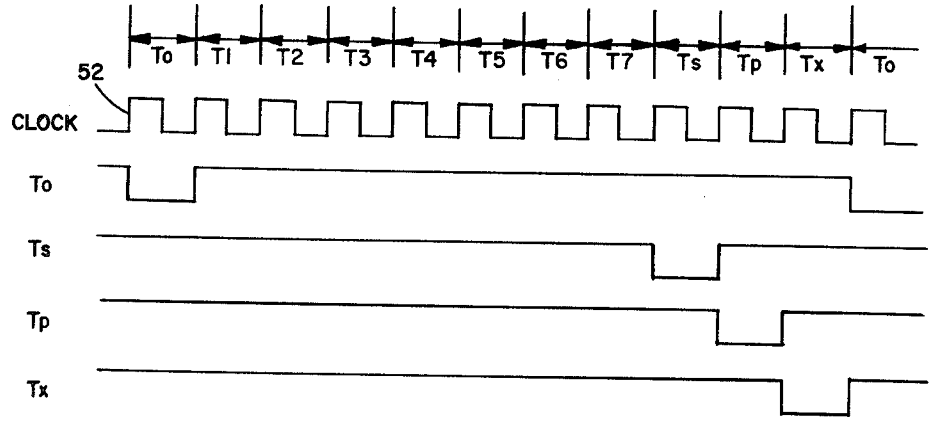
Figure 5:
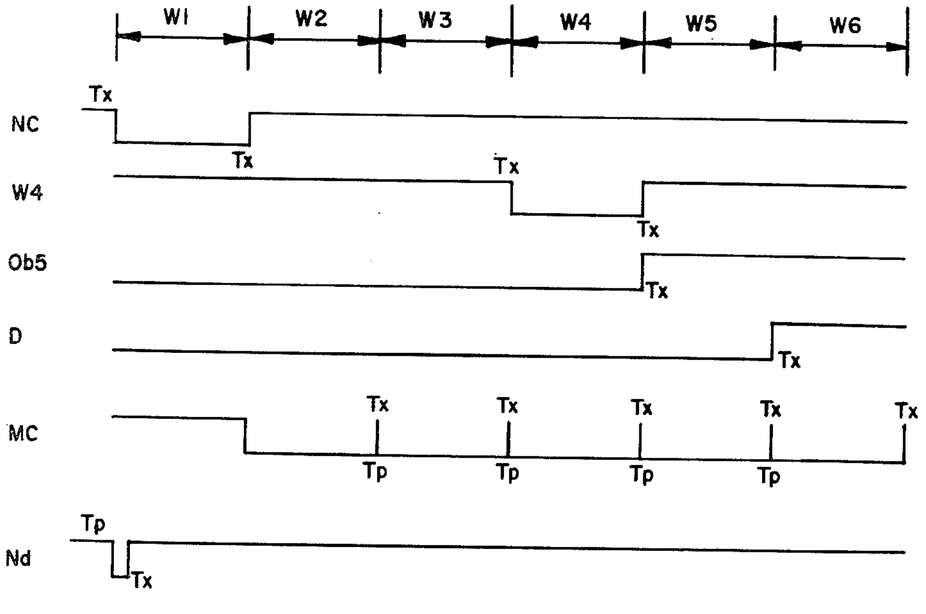
Figure 6:
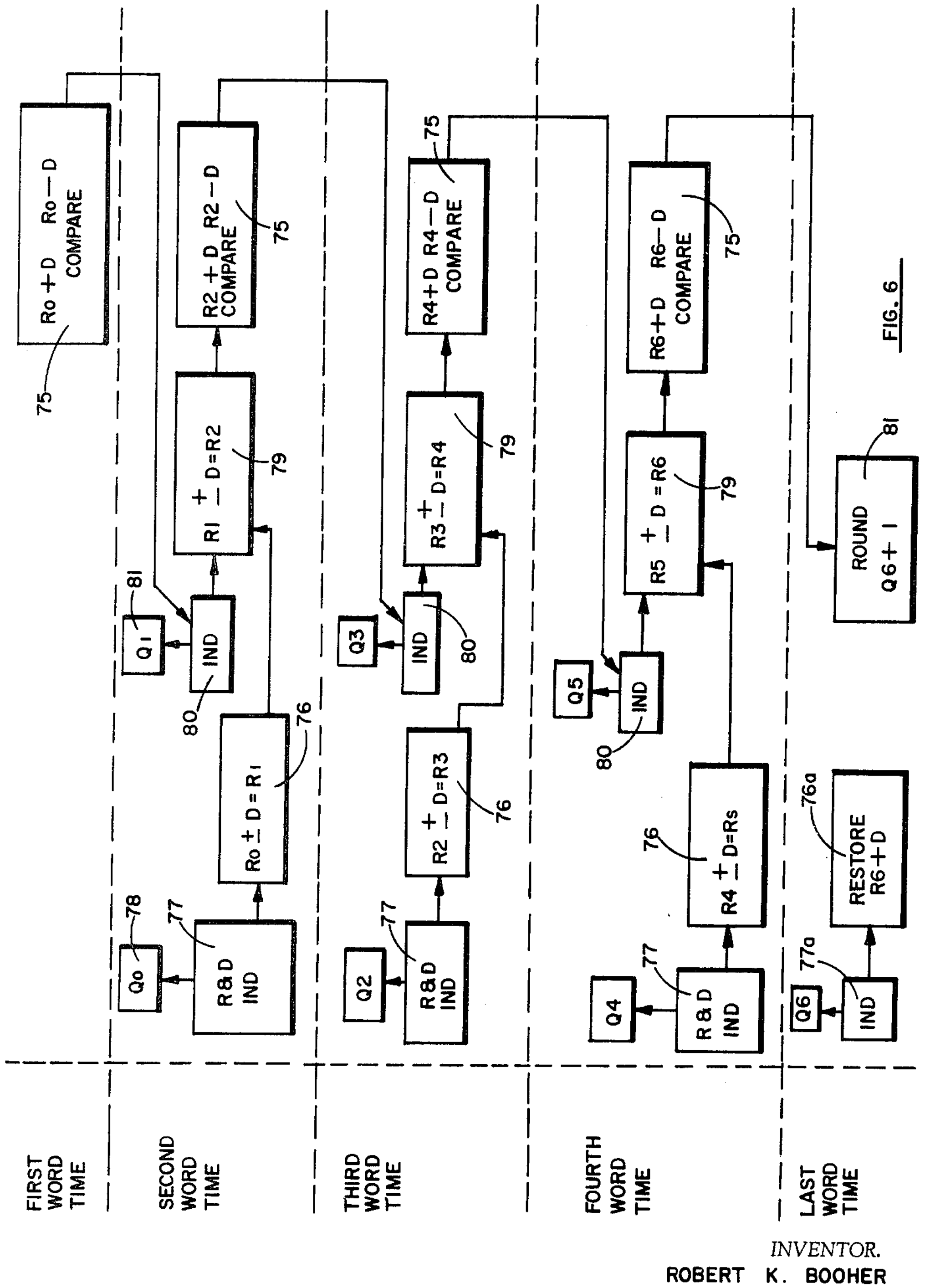
Figure 7:
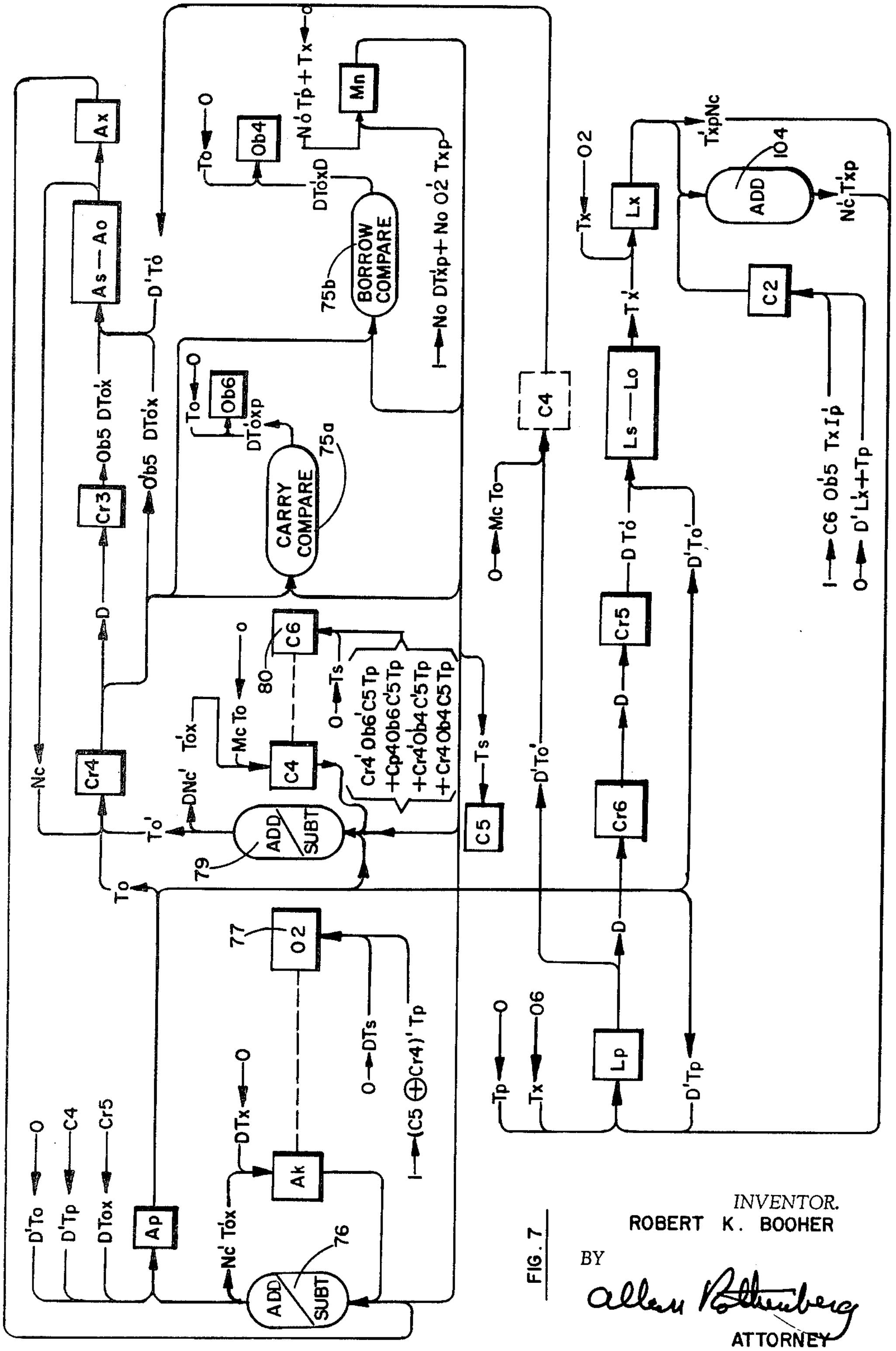
Figure 9A:
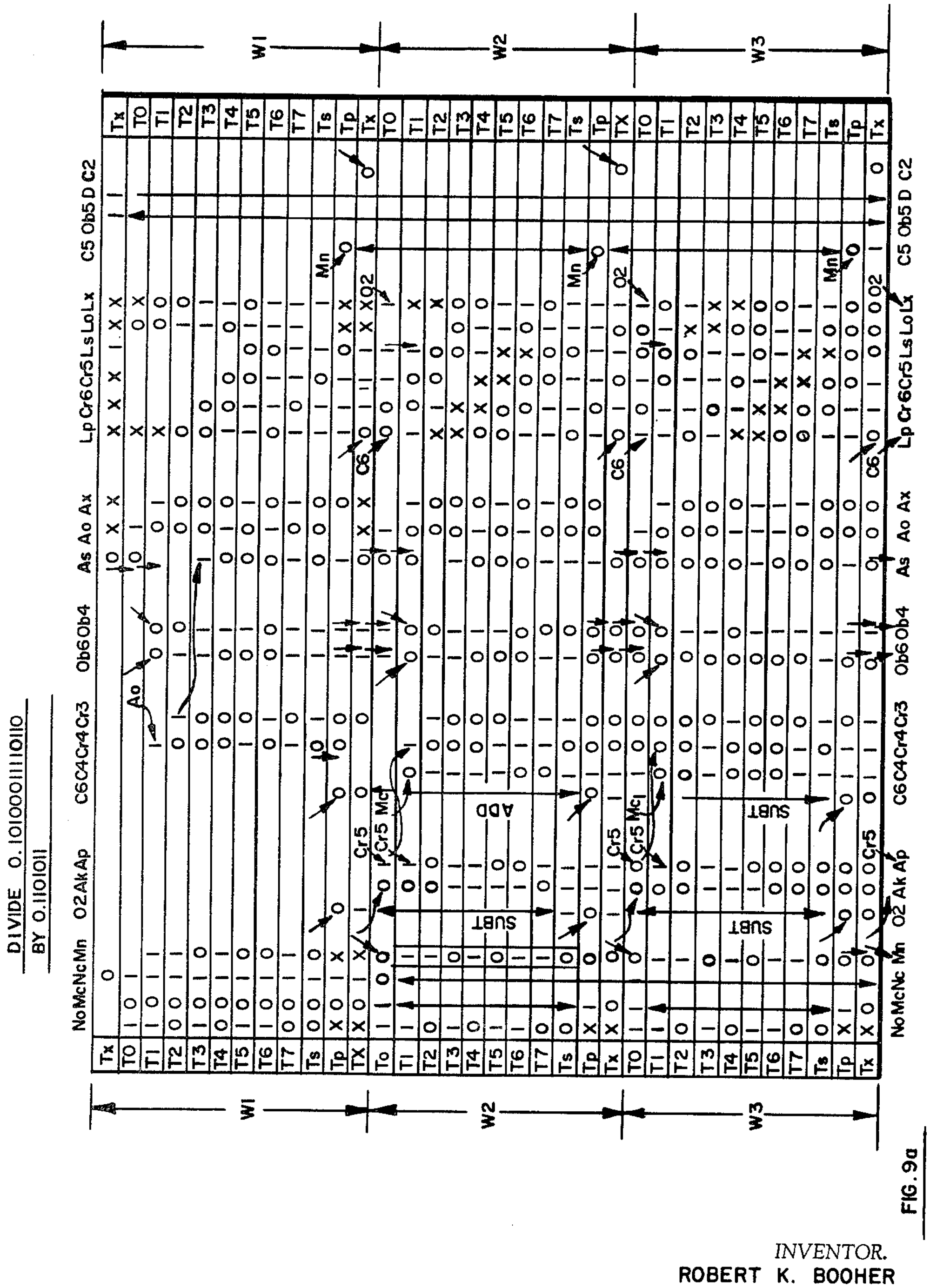
Figure 9B:
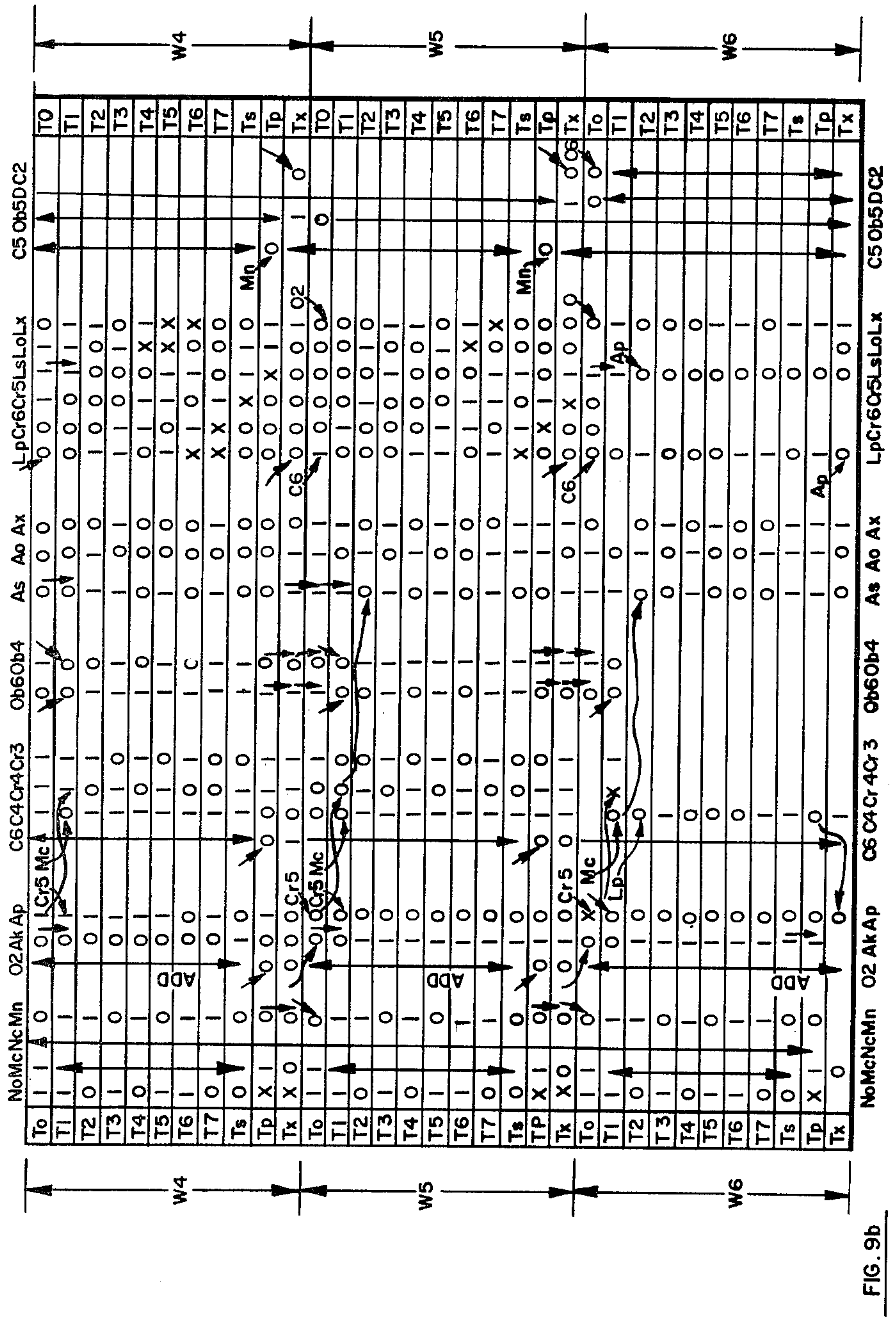
Figure 11:
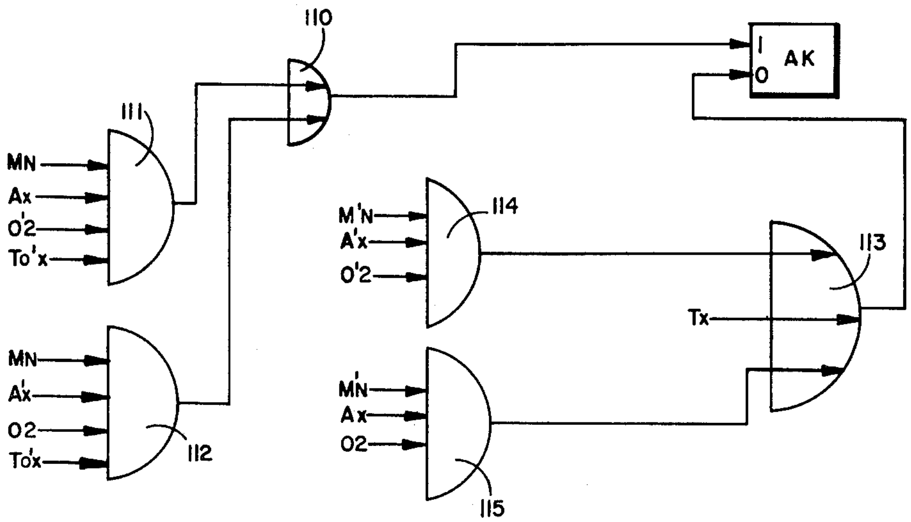
Figure 12:
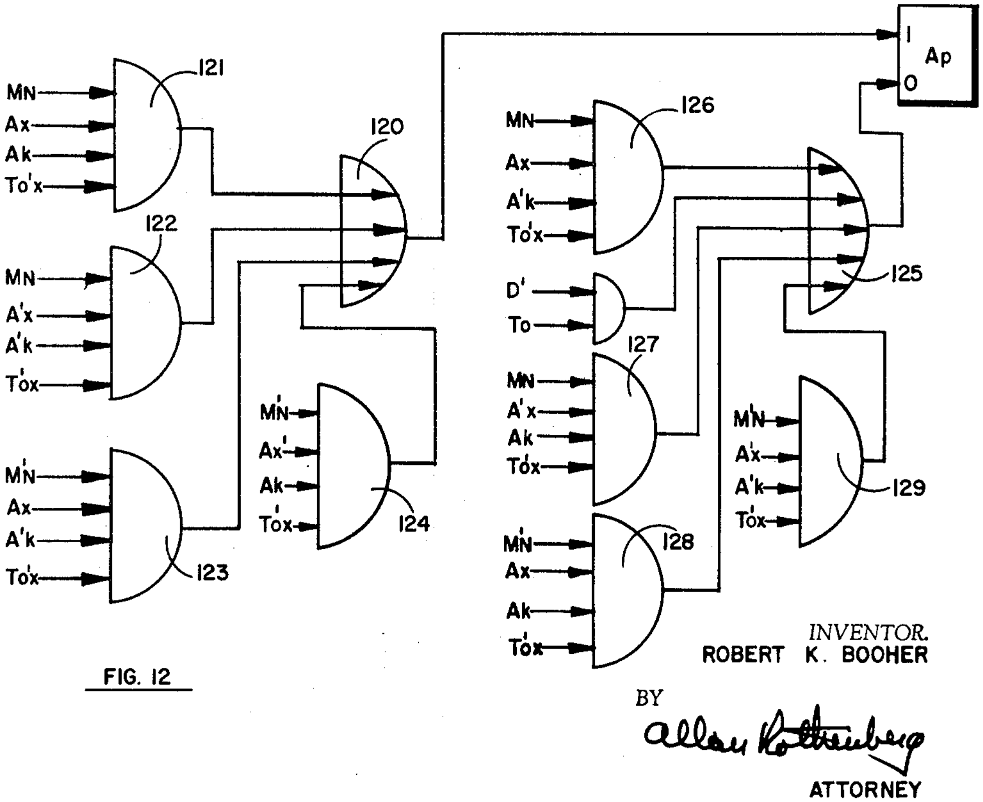

FIGS. 4 and 5 comprise an illustration of certain timing waveforms;

FIG. 6 is a functional flow and block diagram of a preferred embodiment of the invention;

FIG. 7 is a detailed block diagram of division apparatus constructed in accordance with the principles of the present invention;

FIG. 8 illustrates an exemplary mechanization of certain logic;

FIGS. 9*a* and 9*b* collectively comprise a chart illustrating the digits in several registers and flip-flops during a division operation;

FIG. 10 illustrates the contents of certain flip-flops illustrating results of each step of the computation detailed in FIGS. 9*a* and 9*b*;

FIGS. 11 and 12 illustrate an exemplary mechanization of add-subtract logic, and FIG. 13 comprises a truth table associated with the logic of the look-ahead comparison.

The particular machine which is described herein as an exemplary mechanization of the principles of applicant's invention is a serial binary computer where numbers are represented as fractions with all significant digits or bits considered to be positioned immediately to the right of the binary point, and a bit in a sign position immediately to the left of the binary point indicating whether the number is positive or negative. Thus, if the bit immediately to the left of the point, the bit which precedes the number itself, is a one, the number is known to be a negative number whereas if the sign bit is zero, the number is a positive number. Further, in the exemplary machine employed herein for purposes of exposition, negative numbers are represented in the two's or true complement form. As well known, the true complement of a fractional binary number B is equal to $2^0-B$. Thus for example the number 0.101 represents the positive number 5/8 and the complement of this number is 1.000—0.101, which gives 1.011. The latter comprises a representation of the number −5/8. Thus the number −5/8 is represented as the two's complement of the number +5/8, that is, 1.011 is the two's complement of 0.101.

*Machine structure*

Figures 1, 2:
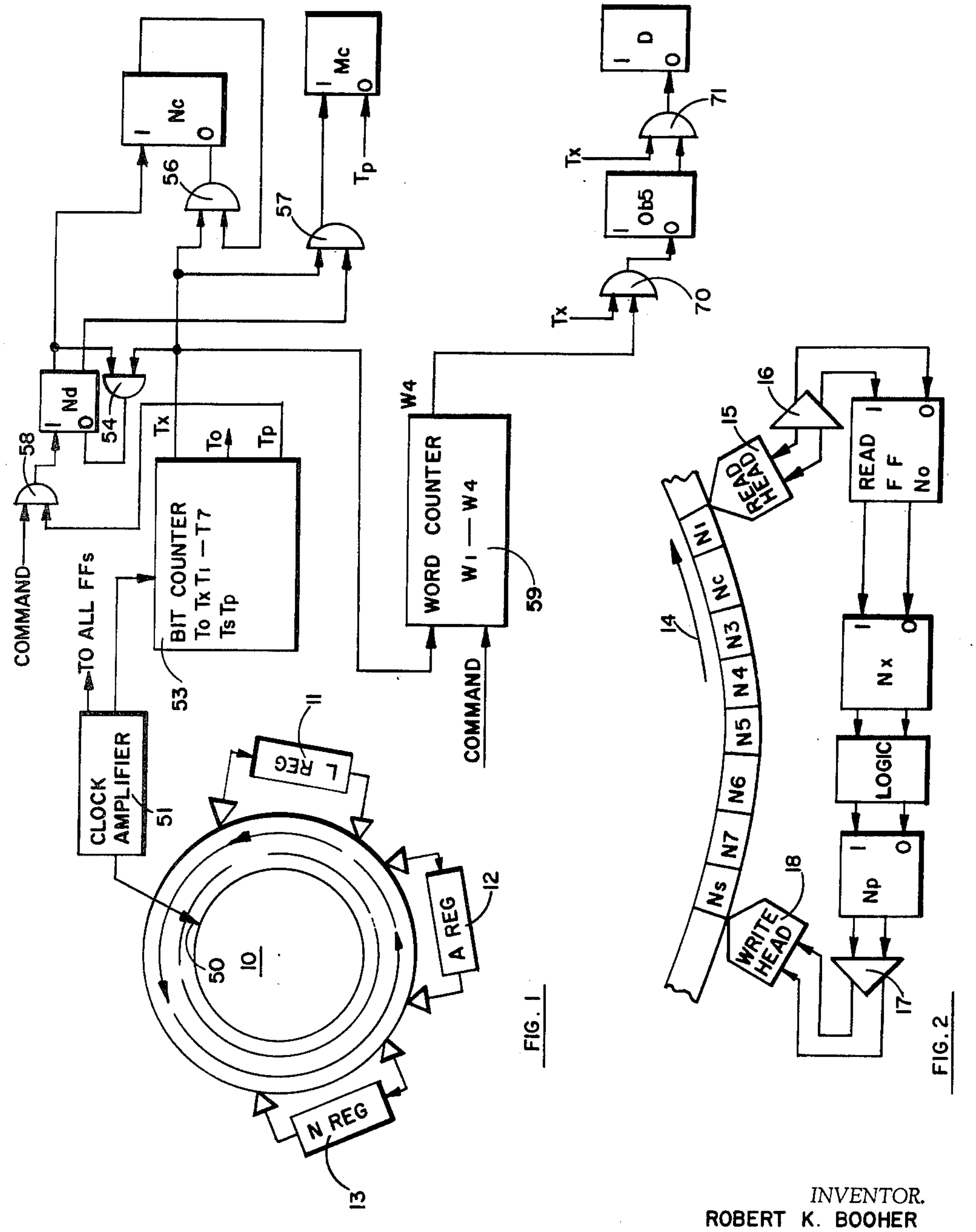
FIG. 2 is an illustration of a typical register.

In an exemplary machine which is capable of carrying out division according to the principles of this invention there are employed a number of conventional serial binary computing components and elements all of which are well known to those skilled in the art and require no detailed description. For example, as illustrated in FIG. 1, the machine employs a rotating disc memory of the type more particularly described in United States Patent No. 2,899,260 issued Aug. 11, 1959, to W. A. Farrand having a rotating disc 10 on which are magnetically recorded a number of channels of information. For the performance of the division described herein, there are required three re-circulating registers indicated as the L register 11, the A register 12, and the N register 13 each of which includes a number of flip-flops external to the disc, a read head and write head and storage of a number of bits on a channel of the disc as will be described more particularly in connection with the detailed description of the N register shown in FIG. 2.

Except for the number of flip-flops employed external to the disc, each of the registers 11, 12 and 13 is substantially identical to the others. In the exemplary embodiment to be described herein, eight-bit numbers are employed wherein seven bits represents the number itself and the eighth bit is the sign bit. For the handling of such seven bit plus sign numbers, the register has a capacity of eleven bits where the extra bits are employed for timing and other purposes as will become more readily apparent as the description proceeds. Thus, as illustrated in FIG. 2, the N register will include a portion of a channel of the disc 10 which includes eight bit positions illustrated as N1 through N7 inclusive and N*s*. As the disc 10 rotates in the direction of arrow 14, bit N1 is read by means of a read head 15 and fed through an amplifier 16 to a read flip-flop N*o*. The input to each flip-flop is clocked so as to clock all the flow of information through this computer. Thus, in the absence of special logic gates, during each clock interval the read head output is copied into N*o*, the bit in flip-flop N*o* is copied into a flip-flop N*x* and the bit in the latter is copied into a flip-flop N*p*. Similarly the bit in N*p* is fed through a write amplifier 17 and a write head 18 to be written into the bit position indicated as N*s* of the disc channel. Thus it will be seen that this conventional circulating register requires eleven bit times for each of the eleven bits (stored three in the flip-flops and eight on the magnetic disc) to appear in any one of the three external flip-flops N*o*, N*x*, and N*p* from which the number may be read out serially as is well known to those skilled in the art. Certain logical gates between N*x* and N*p* and between N*p* and the write head may be provided for causing given bits to be copied or not copied at certain times as will be more particularly explained below.

The particular details of the registers, memory, and flip-flops form no specific part of this invention since there are many well known memories, flip-flops, recirculating registers and the like which may or may not employ a magnetic memory which can be utilized in the practice of this invention. So too, the particular number of bits chosen for a register and the particular size of a register are selected herein merely for purposes of exposition since it is readily apparent that numbers of greater or smaller length may be employed. In an actual machine in which the present invention has been successfully embodied the word length (generally equivalent to number length) is 33 bits and a typical register has storage space generally for 35 bits.

*Flip-Flop*

Figure 3:
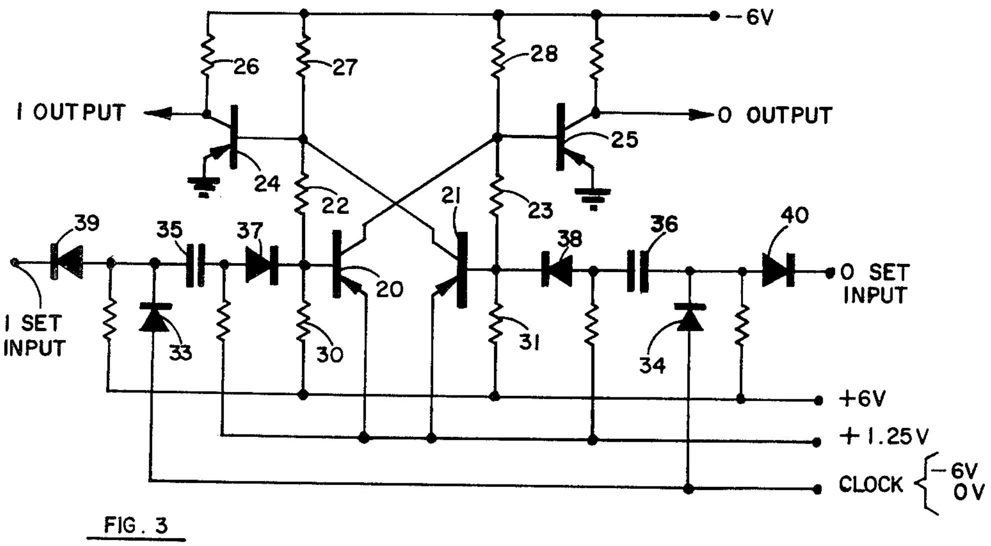
FIG. 3 illustrates details of a typical flip-flop.

Illustrated in FIG. 3 is the circuitry of an exemplary flip-flop which may be employed in the practice of this invention. True condition is represented by −6 volts while false is ground in this machine. Two PNP transistors 20 and 21 are employed in a common emitter configuration with emitters connected to a source of voltage such as +1.25 with cross coupling in the form of resistors 22 and 23 from collector to base of each. These resistors provide the necessary regenerative paths to achieve switching and stability. Two output power amplifiers, including PNP transistors 24 and 25 are connected to the respective collector outputs of transistors 21 and 20 as illustrated. A −6 volt supply is provided to the collectors of each of the transistors through resistors 26, 27, 28 and 29 respectively while the transistor bases are connected to a source of +6 volts through resistors including those indicated at 30 and 31. When transistor 21 is conducting, its collector is at substantially +1.25 volts. Transistor 24 is biased to cutoff by the action of the resistive bridge including resistors 27, 22 and 30 together with the high output of conducting transistor 21. Because of the voltage divider action of resistors 27, 22, and 30, the base of transistor 20 is at a potential equal to or greater than +1.55 volts and transistor 20 is held at cutoff. When the flip-flop is in true state the collector of transistor 25 is at approximately −0.2 volt which is substantially ground, the voltage level indicating false condition of the machine. The leakage path of transistor 20 is provided by resistors 30, 22 and 27 from the positive +6 volt supply. The base current drive for transistors 25 and 21 is supplied from the −6 volt supply through resistors 28, 23, and 31. A clock pulse which varies between zero volts false and −6 volts true is fed to the bases of each of transistors 20 and 21 by means of input diodes 33, 34, capacitors 35, 36 and diodes 37, 38 respectively. The flip-flop operating pulse, the 0-set and the 1-set input pulses which are zero volts for false condition and −6 volts for true condition respectively are fed to the respective inputs via diodes 39 and 40 respectively.

Assuming a true signal to the 0-set side of the flip-flop, namely at the cathode of diode 40, capacitor 36 is charged to −6 volts during the clock pulse interval when the clock pulse is −6. The latter back biases the diode 34 to allow the −6 volt input to be fed to the capacitor through the input diode 40. When the clock pulse terminates and the clock goes to zero volts, diode 34 is caused to conduct and feed a positive signal through the capacitor and through diode 38 to the base of PNP transistor 21 which is accordingly cut off. Cutting off of transistor 21 provides, via the regenerative feedback resistor 22, a conduction of transistor 20 which causes the base of output transistor 25 to go positive. A positive base current to transistor 25 cuts off this PNP transistor whereby its collector goes to −6 volts. Accordingly, it will be seen that a 0-set input, a true signal to the 0-set side of the flip-flop, has resulted in a condition wherein the output at the zero side thereof is true. Similarly, a 1-set input to the other side of the flip-flop will cause the collector of output transistor 24 to go to −6 volts while the collector of transistor 25 goes to zero volts. Thus it will be seen that the functionally represented flip-flop boxes such as N*o*, N*x*, and N*p* of FIG. 2 are illustrated as having two inputs and two outputs, a 1-set input and a 0-set input corresponding to the 1-set input through diode 39 and the 0-set input through diode 40 of the flip-flop of FIG. 3. Similarly the corresponding pair of outputs of each of the flip-flops are obtained from the collectors of the output transistors 24 and 25 respectively.

Each pair of outputs of one flip-flop is sent directly to the corresponding input terminals of the next flip-flop or through logic gates as will be more particularly described. Thus, as illustrated in FIG. 2 wherein the N*x* flip-flop copies the N*o* flip-flop, it will be seen that the true output of the N*o* flip-flop is applied to the 1-set input of the N*x* flip-flop while the false output of N*o* flip-flop is applied to the 0-set input of the N*x* flip-flop. Further, as can be seen in connection with the detailed illustration of FIG. 3, it will be apparent that a flip-flop such as N*x* does not copy the flip-flop such as N*o* to which its inputs are connected or to the outputs of which its inputs are connected until the end of the clock pulse (e.g., until the clock goes false).

*Timing*

In the described exemplary embodiment of applicant's invention, division is achieved two bits at a time in order to substantially halve the time required for performing the entire operation. While the exemplary embodiment employs two-bit-at-a-time division, it will be readily appreciated that the principles of the invention may be applied to serial division which is three or more bits at a time. However, the embodiment employing two-bit-at-a-time division is chosen for illustration since it is the embodiment which has been reduced to practice and successfully operated in a machine which provides a compatable multiplication operation which is itself a two-bit-at-a-time multiplication and is described in the aforesaid co-pending application.

With two-bit-at-a-time division, the computation according to the principles of this invention requires a number of word times equal to two more than one-half of the total number of significant bits in the desired quotient. That is, for the seven bit plus sign quotient employed in the exemplary embodiment, a total of six word times is required whereas for a quotient of 32 bits, a total of 32/2 plus 2 or 18 word times would be required to perform the division according to the principles of this invention. Thus to obtain an $n$ bit quotient, $n/2+2$ words are required, one word time at the beginning of the operation in order to provide the proper set up of the registers and one word time at the end of the operation to allow for adjustment of the remainder or rounding of the quotient.

For the purposes of setting up the timing in the exemplary machine using an eight bit or seven bit plus sign divisor there is provided, as illustrated in FIG. 1, a train of clock pulses obtained from a read head 50 which reads a series of prerecorded alternate 1's and 0's on a clock channel of the disc recorder. These signals are fed to a clock amplifier 51 which suitably amplifies and shapes the pulses to provide the clock waveform 52 (FIG. 4) to all the flip-flops. Since the registers chosen have space for storage of 11 bits, there is provided an eleven bit or modulo eleven counter 53 which counts pulses from the clock amplifier 51. This bit counter which is a conventional device counts eleven bit times respectively designated herein as T*x*, T*o*, T1 through T7 inclusive, T*s* and T*p* where the eleven bit times T*x* through and including T*p* represent one word time.

While this conventional bit counter modulo eleven counts eleven different bits, there are required for, the described machine, signals representing only four different ones of these eleven bit times, namely, bit times T*x*, T*o*, T*s* and T*p*. Accordingly the outputs of the bit counter are shown to be solely four in number which are thus to be understood to occur at the indicated times. This timing is illustrated in FIG. 4 where it will be seen that the output representing bit time T*x* is normally false (relatively high) and becomes true (relatively low) when the clock pulse goes false at the end of T*p* bit time. T*x* remains false until the clock pulse again goes true and then goes false at the end of T*x* bit time at which instant the previously false T*o* output becomes true and stays for one clock pulse cycle until the clock pulse again cycles. The several counting intervals, T1, T2, T3, T4, T5, T6, T7, and T*s* are also indicated in the chart of FIG. 4. It will be seen that at the end of T*s* bit time, the T*p* output of counter 53 becomes true while at the end of the T*p* bit time, T*x* becomes true and this latter becomes false with the initiation of T*o* bit time.

While many ways of providing for the required timing of the operations of the present invention will be readily apparent to those skilled in the art, there is illustrated for purposes of exposition a convenient manner and apparatus for obtaining unique indications of the first word time which is necessary for set up of the several registers and for providing a unique indication of the last two word times in which unique operations, as distinguished from word times 2 through 4 in the exemplary eight bit embodiment are performed.

As illustrated in FIG. 1, the operation is initiated by a command signal of short duration to a starting flip-flop N*d* for which the logic is as follows:

$$1Nd=Tp \text{ command}$$
$$0Nd=Nd\ Tx$$

At this point, it may be noted that in setting forth the logical equations, the Boolean terms of AND and OR are indicated by conventional symbology. The prime (′) of a symbol indicates the absence of the quantity or the false condition of such quantity. Flip-flops are designated by capital letters with appropriate lower case letters or numbers following as may or may not be necessary. The inputs to the flip-flops are designated by 1 or 0 preceding the indication of the flip-flop itself. Thus, for example, a true input to the one side of the N*d* flip-flop is indicated by 1N*d* whereas a true input to the zero side of this flip-flop is indicated by 0N*d*. Accordingly, from the logic just set forth, it will be seen that there is a true input to the one side of the N*d* flip-flop by the command impulse which may be a pulse of relatively short duration in coincidence with the signal T*p* applied through an AND gate 58. There is a true input to the zero set side of the N*d* flip-flop by the simultaneous occurrence of a true output of N*d* and the existence of the T*x* time interval. The mechanization of these equations is shown in FIG. 1 where the 0-set input to the N*d* flip-flop is provided by the AND gate 54 which receives as one of its inputs the output of the true side of the N*d* flip-flop and, as the other of its inputs the signal T*x* from the bit counter. Accordingly, it will be seen that flip-flop N*d* is set true by the initial command pulse and T*p* and is thereafter true only through the very next T*x* bit time by which it is triggered to become zero at the very next T*o* time. The flip-flop N*d* thus remains false from the initiation of the first T*o* time of the first word time throughout the entire operation, being true only for the very first T*x* bit time. The control timing is illustrated in FIG. 5 which indicates that N*d* flip-flop is initially true, being set true by the command pulse and then is triggered at T*x* bit time to become false at the very next T*o* time where it remains throughout all of the word times of the operation.

For the purposes of uniquely representing the first word time, there is provided a flip-flop N*c* which as indicated in FIG. 5, is true for the first word time and false thereafter. The logic on flip-flop N*c* is:

$$1Nc=Nd$$
$$0Nc=Nc\ Tx$$

As illustrated in FIG. 1, the N*c* flip-flop is 1-set by the true output of N*d* and is thereafter 0-set whenever it is true by means of an AND gate 56 which receives an output from the one side of N*c* and also the T*x* bit time signal.

For other timing purposes which will become apparent as the description proceeds, there is provided a flip-flop M*c* on which the logic is $$1Mc=Nd'\ Tx$$
$$0Mc=Tp$$

As illustrated in FIG. 1, the flip-flop M*c* is set to 1 by means of an AND gate 57 which receives inputs from the T*x* true signal and from the N*d*′ signal indicating that the flip-flop M*c* is set to 1 at the first T*x* time that the N*d* flip-flop is false. M*c* is set to zero at each T*p* bit time.

For the purpose of counting words and indicating the last and next to the last word times during which unique operations will occur, there is provided a conventional word counter 59 which counts the T*x* pulses from the bit counter 53. The word count of pulses T*x* is initiated by means of a command which turns the counter on. The word counter counts four word times W1 through W4. However, for the purposes of this invention, this conventional word counter is arranged to provide solely an output which indicates the fourth word time. As indicated in FIG. 5, the word counter output W4 is triggered true by the T*x* at the end of the third word time and is triggered to false condition by T*x* of the succeeding word time.

Certain additional flip-flop O*b*5 and D are provided which are set true prior to initiation of the multiplication operation by suitable means of which the details form no part of this invention.

For the purpose of indicating the last two word times, word times 5 and 6 in the illustrated example, there is provided the flip-flop O*b*5 on which the 0-set logic is $$0Ob5=W4\ Tx$$

Thus, as illustrated in FIG. 1, the signals W4 and T*x* are provided to the 0-set side of O*b*5 by means of an AND gate 70. Accordingly, flip-flop O*b*5 which is initially 1-set is triggered to the false condition by the bit time T$x$ of word time 4 and is uniquely false for word times 5 and 6.

The last word time is uniquely indicated by the false condition of the flip-flop D on which the 0-set logic is $$0D=0b5\ Tx$$

As illustrated in FIG. 1, the D flip-flop is initially 1-set and is thereafter 0-set by the first T$x$ occurring during the false condition of O$b$5. The latter logic is achieved by means of an AND gate 71. The waveform and timing on all the flip-flops and word counter of FIG. 1 are illustrated in FIG. 5 wherein the bit times such as T$o$, T$x$ and T$p$, which appear on the waveforms indicate the trigger times of the changes of states of the several flip-flops.

*Functional description*

The non-restoring division performed by the machine described herein operates upon both positive and negative numbers, where negative numbers are represented in two's complement form, and provides a true remainder (when the quotient is not rounded) always having the same sign as the divisor.

Where the process of non-restoring division operates with divisor and dividend always of like sign, the operation is to subtract and shift. If no over-borrow occurs, subtraction again takes place followed by a shift and continued subtraction. For each such subtraction without over-borrow, a one is placed in the appropriate order of the quotient. If, however, an over-borrow occurs, a zero is placed in the appropriate quotient order and the following steps are shift and restore or add back. Thus, the step of addition denotes a zero quotient digit. It will be seen that the initial step is always a subtraction of the magnitude of the divisor from the magnitude of the remainder.

If we start with a divisor and dividend of unlike sign, the first step must be an algerbraic addition which, as before, is a subtraction of the magnitude of the divisor from the magnitude of the dividend. It may be noted that while addition in the case of divisor and dividend or divisor and remainder of like signs is utilized to put a zero into the quotient order, the addition, in the case of a divisor and dividend or remainder of unlike signs, is also utilized to put a zero in the corresponding quotient order. In the latter situation, if an over-carry should be obtained, the next operation is shift and restore. The restoration here is an algebraic substraction which subtraction is also employed as in the case of like divisor and dividend sign to put a one into the quotient order. If there is no over-carry, the operation is simply shift and add until the proper number of orders (each being zero) of the quotient is obtained. Thus it will be seen that when we start with like signs of divisor and dividend one and zero are employed to represent respectice quotient digits when the divisor can and cannot be subtracted in magnitude from the magnitude of the dividend or remainder. On the other hand, when unlike signs of divisor and dividend exist an opposite convention, zero and one respectively for the quotient, is employed to indicate that the divisor can and cannot, respectively, be subtracted in magnitude from the dividend or remainder. Accordingly the quotient obtained in the situation where the divisor and dividend are of unlike sign, is the inverse or one's complement of the corresponding quotient obtained where divisor and dividend are of like sign. The one's complement may be converted to true or two's complement simply by adding one to the lowest order. Thus if the divisor and dividend are of unlike sign, the true quotient, which of course is negative, is obtained by adding a one to the lowest order of the indicated quotient obtained by the previous computational steps.

From the explanation set forth above, an algorithm for the non-restoring division performed by the machine described herein may be derived. This algorithm is to perform a computation of the nature which will result in decrease of the magnitude of the dividend for the first step and decrease in the magnitude of the previously-obtained remainder for each successive step. Accordingly, if the sign of the remainder and sign of the divisor are the same, subtraction of the divisor from the remainder is required in order to reduce the magnitude of the remainder. Further, if the signs are different addition is required in order to reduce the magnitude of the remainder. If subtraction is indicated by like signs of remainder or dividend and divisor, the corresponding quotient digit is one whereas if addition is indicated by unlike signs, the quotient digit corresponding to this particular computation is a zero. This mode of computation will yield a negative quotient represented in one's complement form since the digit recorded for a particular computation involving a negative quotient is the inverse of that recorded for the same computation involving a positive quotient. The quotient so obtained is in error only by one, approximately, in its lowest order if we omit conversion to two's complement.

The described embodiment of the invention provides for an optional mode of operation in which rounding of the quotient is achieved. The round operation which takes place during the last word time is performed in the light of a comparison made during the next to the last word time and achieves a rounding off of the indicated quotient such that it does not differ from the actual quotient by an amount greater than one-half of the value of the lowest order of the indicated quotient. For example, consider an actual positive quotient Q$a$ such as 01100010XXXX where the X's of this actual quotient are unknown, and we are interested in a quotient of only seven bits plus sign. For the purposes of this discussion, let us consider that the least significant known order, the least significant zero of the above-mentioned actual quotient, is in position $2^0$. If the first X to the right of this least significant digit is a zero, the actual quotient Q$a$ must have a value somewhere between the indicated quotient value Q$i$ (indicated by the known quotient digits) and a value just less than one-half greater than that indicated. That is, $Qa=Qi$ to $Qi+\frac{1}{2}$. Accordingly, if such next digit represented by the first or most significant X is determined to be a zero, nothing further need be done to the indicated quotient digits.

If, however, the most significant X is determined to be a one, then it is known that the true quotient Q$a$ must be between one half and one greater than the value indicated by the known quotient digits. That is $Qa=Qi+\frac{1}{2}$ to $Qi+1$. Consequently to get the indicated quotient $Qi$ back to within ½ of the actual quotient Q$a$, we will add a single unit to Q$i$ to get a value such that $Qa=Qi-\frac{1}{2}$ to Q$i$. Thus by adding a one only if the next lower quotient digit is one and doing nothing if it is a zero, we will obtain a value of the indicated quotient which is equal to the actual quotient plus or minus ½ of the value of the lowest order digit of the indicated quotient.

When round is commanded in the computation of this machine, the round-off operation is combined with the conversion of a negative quotient (obtained in one's complement) to the two's complement form thereof, where such conversion is necessary. The combined operation is the same as that described for the round procedure, namely, add one if the next quotient digit is one and do nothing if it is zero. This combined operation will be more readily apparent upon consideration of the following analysis.

If the quotient is positive, no conversion between complement forms is required and the round operation obviously is as described above.

If the quotient is negative and if the next significant digit (not actually indicated in the indicated quotient) is a one, a restoration is indicated and the indicated quotient has a value which requires no round operation. We will again consider the least significant quotient digit to have a value of $2^0$. In order to convert the one's complement to two's complement, we must add one to the indicated value of the quotient. Knowing that the next quotient digit is a one, whereby no round operation is required for this negative quotient, we may state that $-Qa=-Qi+1$ to $-Qi+1-\frac{1}{2}$. Accordingly by adding one (a single unit to the lowest order) to the quotient $Qi$, we will adjust the one's complement to make it true complement and obtain a result which is within one-half of the actual value.

If the quotient is negative and the next succeeding quotient digit (lower than the lowest required quotient digit) is a zero, it is known that no over-carry resulted and a round operation is required. However, for the round operation, alone, with a negative number we must subtract one from the indicated quotient. On the other hand to convert the negative quotient obtained in one's complement to two's complement we must add one. Accordingly the two operations cancel and nothing need be done to achieve the round where the next quotient digit is zero and the quotient is negative.

There is available a command to divide without round-off. In such unrounded divide, the round operation is omitted and, further, negative quotients are left in one's complement form. This is required to facilitate multi-precision (double-length) division. If the quotient were converted to two's complement (in the first half of a double-length division) the number so converted would represent the upper bound of the quotient. Yet it is desired to be able to add a positive number to such first quotient (as will be more particularly explained hereinafter) to obtain an answer with more digits. By leaving the first quotient in one's complement form, this number, when viewed as a two's complement, represents the algebraic lower bound of the true quotient. Hence a positive second quotient may be added to it to obtain a closer answer.

In handling the remainder, it is noted that the operations provided for a remainder having the same sign as that of the divisor if the quotient is unrounded and double-length division is required. When such double-length division is required, the remainder is conditionally modified to satisfy the rule that $$\text{Dividend}=(\text{Quotient})(\text{Divisor})+(\text{Remainder})$$

With this arrangement, a division of the first remainder (to obtain a double-length quotient) will always yield a positive second quotient with the bits of the second quotient, excluding sign, being a continuation of the bits of the first quotient. Note that we never require both rounded quotient and double-length division. Consequently, the operation upon the remainder which results in a modified remainder only if the quotient is unrounded causes no difficulties. The algorithm followed to achieve this handling of the remainder is simply to add with no shift if the sign of the divisor and sign of the last-obtained remainder are different while if they are alike, do nothing.

When double-length division is required, two different divisions are performed and the results thereof combined to yield a single quotient. First, the dividend is divided by the divisor to obtain a first quotient and remainder. Then remainder of the first division is divided by the same divisor to obtain a second quotient. The described invention is arranged to perform such a modification of the remainder of the first division as to enable a simple combination of the first and second quotients to yield a single double-length quotient.

The combination of first and second quotients employed in the disclosed embodiment is the appending of the digits (less sign bit) of the second quotient to the low end of the first quotient so that the second quotient bits simply form a continuation of the first quotient bits. Mathematically such appending comprises addition of a positive second quotient to orders of the first quotient below the least significant bit. To permit such simple combination of first and second quotients by appending, it is necessary to conditionally modify the magnitude and sign remainder of the initial division by the algorithm set forth above (e.g., add the divisor only if the signs of remainder and divisor are different). This algorithm provides for a remainder such that dividend=(quotient)(divisor)+remainder.

If the signs of remainder and divisor are the same, the algorithm dictates "do nothing." If the signs are different, the divisor is added back. The remainder never has a greater magnitude than the divisor. Consequently, when a divisor and remainder of different signs are added, the remainder sign changes and the new remainder takes the sign of the divisor. Thus it will be seen that the algorithm always provides a positive second quotient by causing the remainder of the first division to have the sign of the divisor.

That this algorithm also provides for a conditionally modified remainder of proper magnitude may be understood from a consideration of the first and last steps of the division operation. At the end of the next to last step of the division, there exist a remainder which may be designated $Rn-1$ together with an indication (defined by the state of a flip-flop O2 to be described hereinafter) of the nature of the last operation (e.g., add or subtract) required to obtain a last remainder $Rn$. It is this remainder, $Rn$, which is to be divided by the divisor in the second division operation of double length division with the quotient bits therefrom to form a continuation of the quotient bits of the first division.

It is to be noted, as more particularly described hereinafter, that the first two steps of the described division yield, first, an overflow indication and, second the quotient sign bit. These are neither necessary nor desired in the second division operation of double length division. Consequently, either the logic must be changed to eliminate these two steps for the second division only or the remainder $Rn$ of the first division must be so modified that the results of the usual first two steps of the second division will yield a remainder $Rn$. The latter course is chosen here.

The first two division steps are (1) subtraction of the divisor from the dividend (since the signs are always alike in the second division of double-length division) and (2) a shift, equivalent to multiplication of the remainder by two, and addition of the divisor (note that addition must occur here unless the divisor is smaller than the dividend which is an impossible situation for the second division). In the light of these first two steps, and representing the dividend of the second division as $Ro$, it is desired to complete the first division with a modified remainder equal to $Ro$ such that $Rn=2(Ro-\text{Divisor})+\text{Divisor}=2Ro-\text{Divisor}$.

The theoretical last remainder $Rn$ is obtained from the previous remainder $Rn-1$ according to the relation $Rn=2(Rn-1)\pm(\text{Divisor})$ where $\pm$ represents the usual alternative operation, either addition or subtraction, which is designated by the last obtained quotient bit. This is the operation carried out throughout the division including a shift (effectively multiplying the remainder by two) and either adding or substracting the divisor. The equating of the two expressions for $Rn$ to solve for $Ro$ is performed first for the case where addition is called for in the last step and then for the case of subtraction.

Where addition is called for:

$$2(Rn-1)+\text{Divisor}=2Ro-\text{Divisor}$$

whereby:

$$Ro=Rn-1+\text{Divisor}$$

stating that the divisor is added without shifting if addition is called for. Where subtraction is indicated:

$$2RN-1-\text{Divisor}=2Ro-\text{Divisor}$$

whereby:

$$Ro=Rn-1$$

which states that no operation is performed if subtraction is indicated.

Consequently, the algorithm provides for modification (when necessary) of the sign and magnitude of the remainder to allow appending of the second quotient bits to the bits of the first quotient.

Thus it will be seen that in order to obtain a properly modified value of the remainder with sign like that of the divisor, it is simply necessary to add the divisor back to the same orders of the remainder as those from which it was previously subtracted or to which it was previously added if the sign of the divisor is different from that of the last-obtained remainder. If such signs are alike however, no further operation is necessary.

Since numbers are handled as fractions in this machine, it is necessary to know when a divisor is smaller than the dividend. Such division by a smaller divisor would result in a number greater than one and accordingly, an over-flow. For indicating such over-flow, there is obtained a first quotient digit as a result of comparison of the sign of divisor and dividend. If the signs are the same, a one is obtained whereas, if the signs are different, a zero is obtained. The second-obtained quotient digit is the sign of the quotient. Accordingly, if the first quotient digit is a one the sign of the quotient must be positive and the sign of the first significant bit of the quotient (the sign bit) must be a zero. Similarly if the first quotient digit is a zero, it is known that the signs of the dividend and divisor are different so that the sign bit of the quotient must be a one. Consequently if the first two quotient digits are alike, over-flow is indicated. If signs of dividend and divisor are alike, a one is indicated in the first quotient digit and the divisor must be initially subtracted from the dividend. If no over-borrow results, the next quotient digit, the sign bit of the quotient, is also a one indicating that the divisor is smaller than the dividend. Over-flow has occurred. Similar reasoning applies to the case of unlike signs of a dividend and a divisor. Accordingly, when the first two quotient digits obtained are alike, the required division cannot be performed.

While the principles discussed above are obviously applicable to a one bit at a time division, the embodiment of the invention disclosed herein employs these principles in a rapid division wherein two computations, addition and/or subtraction, are performed in each word time.

With reference to the flow diagram of FIG. 6 there is illustrated functionally an exemplary operation requiring five word times which is the number of word times required for a division which obtains a quotient of six digits including sign according to certain principles of this invention. The first word time is required for set up and to provide the first look-ahead operation. This look-ahead is achieved by a comparison logic network 75 in the first word time which performs comparisons of the sum of the divisor D with the dividend R*o* and also of the difference between the dividend R*o* and divisor D. In the second word time a first computation which is either addition or subtraction is achieved by a first add-subtract logic network 76 to provide a first remainder R1. This logic is operated under control of a first add-subtract indicator 77 which determines whether addition or subtraction of R*o* and D will be achieved in this first computation of the second word time. The indicator 77 is set by the relation between the sign bits of R*o* and D. If they are the same, subtraction is called for, whereas if they are different, addition is called for. The setting of the indicator will accordingly set the first quotient digit Q*o* indicated at 78. In this second word time as in each intermediate word time, other than the first and last, a second computation, either addition or subtraction, is provided by means of a second add-subtract logic network 79 under control of a second add-subtract indicator 80 which in turn determines the value of the second quotient digit Q*l* indicated at 81.

The logic 79 provides for either addition or subtraction of the divisor to or from the remainder R1 which was obtained as a result of the operation of the first add-subtract logic 76 in the second word time. This second addition or subtraction yields the second or last obtained remainder R2 of the second word time. As previously indicated, the second add-subtract indicator 80, which controls the nature of the second computation of a given step of the division is itself set by means of the look-ahead or comparison logic 75 which operated during the previous word time, the first word time in this particular instance. This look-ahead logic 75, as will be more particularly described hereinafter involves a determination of the existence of a carry or borrow, if any, resulting from addition or subtraction of R0 and D together with an examination of the sign of the previously-obtained remainder or, for the first word time, the dividend and also the sign of the divisor. Taking into consideration these several factors determination of the required state of the indicator 80 is obtained. Accordingly the second word time performs two computations of which each is either addition or subtraction of the divisor to or from the previously obtained remainder and obtains two remainders during such second word time. The same look-ahead comparison logic 75 operates during the second word time as indicated in the flow diagram of FIG. 6 to compare the last-obtained remainder of the second word time R2 with the divisor to obtain an indication of the required setting of the second add-subtract indicator 80 for the next or third word time. In the third word time, the first add-subtract logic 76 combines either additively or subtractively the last-obtained remainder R2 with the divisor to obtain a remainder R3 under the control of first add-subtract indicator 77 which compares the divisor sign with the sign of last-obtained remainder R2 of the previous word time to yield the next lower order quotient digit Q2, which is the most significant order of the quotient.

Just as in the second word time, the second add-subtract logic 79 combines the first obtained remainder R3 of the particular word time additively or subtractively with the divisor to obtain a second remainder R4 for the third word time. The nature of this computation is determined by the second add-subtract indicator 80, the state of which defines the second most significant digit Q3.

The look-ahead comparison also operates in the third word time to compare the last-obtained remainder of this word time R4 with the divisor in the light of the sign of the remainder R4 and the sign of the divisor to set the second add-subtract indicator 80 during the fourth word time. In such fourth word time the first operation performed by the first add-subtract logic 76 is to additively or subtractively combine the divisor with the last-obtained remainder of the previous word time R4 under control of the first add-subtract indicator 77 which indicates the nature of the next quotient digit Q4. As in previous word times, the first add-subtract indicator 77 is set by the similarity or difference of the signs of divisor and last-obtained remainder of previous word times. Similarly, in the fourth word time, the second add-subtract indicator 80 determines the nature, whether addition or subtraction, of the computation performed by the add-subtract logic 79 which combines the divisor with the remainder R5 obtained in the fourth word time by the first add-subtract logic. Thus the indicator 80 determines the nature of the next quotient digit Q5 and the add-subtract logic provides the last remainder R6 of the fourth word time. In this next to last word time, the comparison logic 75 continues to compare the last-obtained remainder with divisor in the light of divisor sign and last-obtained remainder sign for the purposes of both rounding the quotient and converting two's complement as previously explained.

For the round operation, the arrangement of the invention illustrated in the drawings, it is not necessary to wait another word time or perform an additional operation in order to determine the nature of the next quotient digit which is not actually obtained by the division operations per se. The comparison network logic 75 is operable during the next to the last word time to determine the nature of the quotient digit of next lower order (lower than Q6). This comparison operation is employed to control a one input adder 81 which provides the above-mentioned round off of the quotient (together with conversion of a negative quotient to two's complement) by adding a single unit to the least significant quotient digit Q6 if and only if comparison logic 75 determines that the next lower quotient digit would be a one.

In the final word time there is performed both the rounding and conversion to two's complement (if called for) or the handling of the remainder to obtain a remainder of desired value having the sign of the divisor as needed for double-length division. In order to obtain the properly modified remainder $R6+D$ (for use in a double-length division) upon completion of the desired number of steps of the division operation, the last word time is utilized for an operation wherein the divisor D, uniquely without a shift in the next to last word time, may be added to the remainder R6 of the previous word time. This modification of the add-subtract logic is indicated in FIG. 6 by the utilization of reference numeral 76*a* to apply to the modified logic in this word time. So too, the first add-subtract indicator is modified, as indicated at 77*a* to provide for operation of the first add-subtract logic if and only if addition is indicated. The final quotient digit Q6 is determined by the first add-subtract indicator 77*a* of the last word time. If subtraction is indicated by indicator 77*a*, the appropriate digit, namely a one, is set into the last quotient digit Q6 but the add-subtract logic 76*a* does not operate. In effect then, if subtraction is indicated during the last word time, no operation takes place at all and R6, as determined by add-subtract logic 79 of the preceding word time, comprises the modified remainder.

*Description of logic*

A collection of the logic equations of the described embodiment is set forth at the end of the specification.

The disclosed exemplary embodiment of the invention divides a 14-bit plus sign number found in registers designated as A and L registers by a number found in the N register. Upon completion of execution of the division operation, the A register contains the quotient rounded or unrounded as desired, the L register contains the remainder with the same sign as the divisor while the N register continues to contain the divisor. Division is performed two bits per word time and is completed in six word times for the exemplary seven bit plus sign bit quotient. The number of word times required for a given division operation is actually half the number of required quotient digits plus two, since two quotient digits are obtained for each intermediate word time and one extra word time is required at the beginning and end of the operation.

Illustrated in FIG. 7 is a schematic block diagram of the A and L registers together with necessary logic, control and add-subtract circuitry for performing one complete division operation. As will be seen from this figure, the A register has been augmented to increase its normal complement of the eleven-bit storage spaces, A*l* through A*s* together with A*o*, A*x* and A*p*. Of these, as indicated in connection with the description of the N register in FIG. 2, bit positions A*o*, A*x* and A*p* may be flip-flops while the others are actually bit positions on the discs of the exemplary type of recirculating register. While the A register normally has storage space for eleven bits, the two-bit-at-a-time division requires precession of the remainder two bits to the left during each word time to provide the equivalent of a two-bit right shift of the divisor relative to the remainder. Accordingly a two-bit delay is provided by inserting flip-flops C*r*4 and C*r*3 into the A register between flip-flop A*p* and the bit position of A*s* which in an arrangement analogous to that shown in FIG. 2 actually would be insertion of flip-flops C*r*4 and C*r*3 between the flip-flop A*p* and the write head which writes the bit into the A*s* position on the disc channel.

It may be noted at this point that the diagram of FIG. 7 represents the several logical gates required for proper control of information flow by breaking the information flow lines and inserting in the break the symbols representing the control inputs to the several blocks. For example, the insertion of D in the break in the flow line from C*r*4 to C*r*3 indicates that C*r*3 copies C*r*4 only when the flip-flop D (FIG. 1) is true. In other words, the inputs of C*r*3 are derived from the outputs of an AND gate having as an input thereto one output of C*r*4 and the true output of the D flip-flop. Also, where a flip-flop is not copying another but is set in response to some given condition, appropriate inputs of the 0-set or 1-set side of the flip-flop are indicated by a zero or one and a flow line to the flip-flop input therefrom. Such flow line is also broken for insertion of the logic or condition controlling such flow. For example, FIG. 7 indicates flip-flop O*b*6 to be 0-set at bit time T*o* which would indicate that the 0-set side of O*b*6 has an input from T*o*. Similarly flip-flop C2 of FIG. 7 is indicated to be 1-set by the logic C6, O*b*5′, T*x*, I*p*′ indicating that the 1-set side of the flip-flop C2 has an input from the output of an AND gate which has inputs C6, O*b*5′, T*x*, and I*p*′. A detailed description of all of the logic will be set forth hereinafter.

When the described apparatus is embodied in a machine which performs multiplication or other operations such as are described in the above-mentioned co-pending application and in which operations of the same components are used, additional inputs uniquely representing the particular operations desired are employed for all gates operable upon shared components. For example, C*r*4 which is indicated as copying A*o* when N*c* is true does so only during the divide operation. Flip-flop C*r*4 does not copy A*o* during the corresponding multiply operation described in the co-pending application. Accordingly the gates on C*r*4 including N*c* would also have an input (not shown) uniquely indicating divide if the apparatus were to be incorporated into a machine performing multiplication.

At the start of the exemplary division operation, the divisor is in the N register having bit positions N1 through N7, N*s*, N*p*, N*x*, and N*o* respectively, a total of eleven. The divisor recirculates during the entire operation by means of the following logic:

$$1Np=NxNc'Top' \text{ where}$$
$$Top'=To'Tp'$$
$$0NP=Nx'Nc'Top'$$

As indicated in FIG. 7, there is provided an M*n* flip-flop which copies the divisor from the N register by means of the following logic:

$$1Mn=NoDTxp'+NoO2'Txp' \text{ where}$$
$$Txp'=Tx'Tp'$$
$$0Mn=No'Tp'+Tx$$

The gate including N*o* O2′ is provided for use during the last word time to adjust the remainder as will be more particularly explained hereinafter.

The operation of the N register, the copying of N*o* thereof by M*n* together with the operation of A and L registers and other control flip-flops are all illustrated in detail in the FIGS. 9*a* and 9*b* which collectively comprise an illustration of an actual division operation performed by the disclosed apparatus. Successive columns of the chart of FIGS. 9*a* and 9*b*, running horizontally from left to right indicate the several flip-flops and flip-flop register positions as indicated at the top of the chart. Running downwardly are the six word times of the illustrated example and with each bit time T*o* through T*x* inclusive of each word time indicated. The problem worked out in the illustration is the division of the positive number 0.10100011110110 by the positive number 0.1101011. The sign bit and seven most significant bits of the dividend initially appear at the first T*x* bit time prior to the first word time in the A register in bit positions A*l* through A*s* thereof. In this connection, it will be noted that FIG. 10 illustrates all of the pertinent bits in the register flip-flops at each T*x* time of each word time. The seven least significant bits of the dividend initially appear in bit positions L2 through L*s* of the L register.

In the chart of FIGS. 9*a* and 9*b*, arrows are employed to indicate various copying operations to show the flow of one bit from one position to another. For example, in flip-flop A*s* it will be noted that an arrow runs in each word time from T*x* to T0 and from T0 to T1, indicating that flip-flop A*s* does not copy any other flip-flop during these bit times but retains the same state. Similarly it will be noted that flip-flops O*b*6 and O*b*4 have a zero set into each, triggered at T0 time of each word time. Accordingly there is provided for each of these flip-flops an arrow starting at T0 bit time to denote the T0 trigger and terminating at the zero in the appropriate flip-flop position at T1 bit time to denote that this zero is triggered into the flip-flop at T0 bit time. With regard to flip-flops L*p* and L*x* for example, it will be noted that the arrows starting at T*x* bit time and terminating in the T*o* positions of these bit times denote the fact that L*p* and L*x* copy C6 and O2 respectively at T*x* bit time. Similar indications are employed throughout the chart. Another indication employed is the copying of one bit from one position into another. Thus for example, in word time one (W1) there is an arrow to indicate that flip-flop A*s* copies C*r*3 at bit time T2. This arrow denotes a continuing copying as can be more specifically seen from the logic set forth hereinafter. Likewise there are arrows to denote that A*s* copies C*r*4 and C4 respectively during the word times W5 and W6 respectively.

An exemplary mechanization of the logic illustrated by the block diagram of FIG. 7 is shown in FIG. 8. FIG. 8 comprises a showing of the logic on the flip-flop L*p* as indicated in FIG. 7. There is provided a 1-set OR gate 95 having an output connected to the 1-set input side of the L*p* flip-flop and having five inputs respectively from AND gates 96, 97, 98, 99, and 100 which have the respective inputs thereto as indicated in FIG. 8. AND gate 96 causes L*p* to copy L*x* during N*c* true except at T*x* and T*p* bit times. AND gate 98 causes L*p* to copy C6 at T*x* bit time. AND gate 100 causes L*p* to be 1-set if A*p* is true during T*p* bit time of the last word time (D'). AND gates 97 and 99 are employed for the add logic 104 which is operable during the last word time in the combined round-off and complement conversion operation. Similarly the 0-set side of L*p* has an input thereto provided from the output of an OR gate 101 which has inputs from the output of AND gates 102, 103, 105, 106, and 107 respectively together with an input from T*p*. Each of these AND gates 102, 105, 103, 106 and 107 corresponds to a similar AND gate on the 1-set side of the flip-flop L*p*.

During the first word time, as illustrated in connection with FIGS. 7 and 9, the contents of the L register are recirculated and delayed two bit times by going through flip-flops C*r*6 and C*r*5 which are interposed between the L*s* bit position and flip-flop L*p* of the L register. The L register contains bit positions L*o* through L*s*, L*p* and L*x* together with the interposed flip-flops C*r*6 and C*r*5 as indicated in FIG. 7. The logic for the recirculation of the L register during the first word time W1 (indicated by N*c*) is as follows:

$1Lp=LxNcTxp'$
$0Lp=Lx'NcTxp'$
$1Cr6=LpD$
$0Cr6=Lp'D$
$1Cr5=Cr6D$
$0Cr5=Cr6'D$
$1Ls=Cr5DTo'$
$0Ls=Cr5'DTo'$
$1Lx=LoTx'$
$0Lx=Lo'Tx'$

This recirculation and logic are all illustrated in FIG. 7 which shows L*p* copying L*x* through a T*xp'* N*c* gate, C*r*6 copying L*p* through a D gate, and C*r*5 copying C*r*6 through D gate (indicating all but last word time) with L*s* copying C*r*5 through D T*o'* gate, and L*x* copying L*o* except at T*x* through a T*x'* gate. Bit positions L*o* through L7 copy each higher bit position for each clock pulse in the fashion of a conventional circulating register.

The results of the recirculation of the L register during the first word time are illustrated in FIGS. 9*a* and 9*b* and FIG. 10.

During the first word time the contents of the A-register are recirculated with no shift at all by causing flip-flop C*r*4 to copy A*o* instead of having A*x* copy A*o*. Flip-flop C*r*3 copies C*r*4 in place of A*p* copying A*x* and A*s* copies C*r*3 except during the next to last word time (O*b*5' D) when only a single left shift of the remainder is required.

$1Cr4=AoNc$
$0Cr4=Ao'Nc$
$1Cr3=Cr4D$
$0Cr3=Cr4'D$
$1As=Cr3Ob5DTox'$
$0As=Cr3'Ob5DTox'$ where
$Tox=To'Tx'$ This unique recirculation of the A register during the first word time is indicated by the flow line running from the A*o* side of the A register by the N*c* (first word time) gate to the C*r*4 flip-flop.

It will be noted (see FIG. 9*a*) that at the end of the first word time, namely T*s* bit time thereof, flip-flop C*r*4 contains the sign of the dividend while a flip-flop C5 contains the sign of the divisor having copied the sign bit from M*n* by the following logic:

$$1C5=MnTs$$
$$0C5=Mn'Ts$$

The repeated copying of the sign bit by C5 during each word time is done for ease of mechanization. It is necessary, of course, to copy the sign bit only once since the divisor does not change sign during the operation. The dividend sign bit which appears in C*r*4 at T*s* at the first word time also appears in C*r*4 at T*p* as indicated by the arrow going from T*s* to T*p* in the first word time of C*r*4. This retention of the sign bit is due to the fact that A*s* which originally contained the sign bit of the dividend at the very first T*x* starting time does not copy at T*x* and accordingly the sign bit is "stretched" in T*s* to appear in C*r*4 at both T*s* and T*p* bit times.

According to the rules of the present division, we will subtract when the sign of dividend or previous remainder is the same as that of the divisor and add when they are different. Accordingly C5, the divisor sign, and C*r*4 at T*p*, the previous remainder or dividend sign, are compared to set the first add-subtract indicator 77, flip-flop O2, for the first add-subtract logic 76, by means of the following logic:

$$1O2=C5Cr4Tp+C5'Cr4'Tp$$
$$0O2=DTs$$

Note that FIG. 7 shows the "exclusive OR prime" gate $(C5 \oplus Cr4)'$ which is the same as $C5Cr4+C5'Cr4'$.

Thus it will be seen that the flip-flop O2 is 0-set at each T*s* bit time (except the last word time) and at the immediately following T*p* bit time is 1-set only if the signs of divisor and remainder are alike. The indicator O2 will remain set as it is by the T*p* trigger until the next T*s* bit time when it is again zeroed.

With an indication from add-subtract indicator O2, the add-subtract logic 76 operates to either add or subtract to or from the remainder appearing in A*x* the divisor appearing in M*n* by means of the following logic and utilizing a flip-flop $Ak$ as a carry-borrow flip-flop and storing the sum or difference in $Ap$:

$$1Ak=MnAxO2'Tox'+MnAx'O2Tox'$$
$$0Ak=Tx+Mn'Ax'O2'+Mn'AxO2$$
$$1Ap=MnAxAkTox'+MnAx'Ak'Tox'+Mn'AxAk'Tox'+Mn'Ax'AkTox'$$
$$0Ap=D'To+MnAxAk'Tox'+MnAx'AkTox'+Mn'AxAkTox'+Mn'Ax'Ak'Tox'$$

The mechanization of the add-subtract logic on $Ap$ and logic on the carry flip-flop $Ak$ for the first addition-subtraction of each word time is illustrated in FIGS. 11 and 12. As shown in FIG. 11, the logic on the 1-set side of carry flip-flop $Ak$ comprises an OR gate 110 having as one of its inputs the output of an AND gate 111. The latter has the inputs $MnAxO2'$ and $Tox'$, as indicated by the previously described logic. A second input to 1-set OR gate 110 is derived from the output of a second AND gate 112 having the indicated inputs thereto. In a like manner, the 0-set side of $Ak$ derives its true signal input from the output of an OR gate 113 having three inputs of which one is derived from the $Tx$ bit time signal. A second input to the OR gate 113 is derived from an AND gate 114 having the indicated inputs thereto. The third input to OR gate 113 is derived from AND gate 115 having the inputs thereto as illustrated in the drawing.

The mechanization of the logic on the sum-difference flip-flop $Ap$ is illustrated in FIG. 12. The 1-set side of flip-flop $Ap$ derives its true signal from the output of an OR gate 120 having four inputs thereto from AND gates 121, 122, 123, and 124 respectively. Each of these AND gates has the inputs thereto as indicated in FIG. 12. Similarly, the 0-set side of $Ap$ derives its true signal from an OR gate 125 having $D'\ To$ as one of the inputs. The other four inputs to OR gate 125 are derived from AND gates 126, 127, 128 and 129 respectively having the indicated inputs thereto.

Upon completing the first operation which is either addition or subtraction in a given word time, the most significant digit of the L register must be appended to the low end of the remainder so that the relatively right shifted divisor may again be added or subtracted. Accordingly, $Ap$ in which appears the sum or difference (remainder) resulting from the first computation of a given step is caused to copy $Cr5$ at $To$. It will be seen that $Cr5$ contains the most significant bit of the dividend remaining in the L register at $To$. It may also be noted that $Cr5$ at $Tx$ time contains the second most significant bit of the dividend remaining in the L register. Since two computations are to be performed for each word time, it will be necessary during this second word time to also append the second most significant digit of the remainder in L register to the first obtained sum or difference. Accordingly $Ap$ also copies $Cr5$ at $Tx$ bit time. This is achieved by the following logic:

$$1Ap=Cr5DTox$$
$$0Ap=Cr5DTox$$

There is provided a second add-subtract network 79 which operates each word time to add or subtract the divisor in $Mn$ to or from the first obtained remainder appearing in $Ap$ utilizing a flip-flop C4 as a carry-borrow flip-flop and adding or subtracting under the control of the second add-subtract indicator 80 which comprises a flip-flop C6. The logic for this second add-subtract network is substantially analogous to that for the first add-subtract network 76. The carry-borrow flip-flop C4 has the following logic:

$$1C4=MnApC6'Tox'+MnAp'C6Tox'$$
$$0C4=Mn'Ap'C6'Tx'+Mn'ApC6Tx'+McTo$$

Note that the carry-borrow flip-flop for the second add-subtract logic is 0-set by Mc at each $To$ just as the carry-borrow flip-flop $Ak$ is 0-set at each $Tx$ immediately prior to the corresponding addition or subtraction operation. The sum or difference resulting from operations of the second add-subtract logic 79 is stored in flip-flop $Cr4$ as follows:

$$1Cr4=MnApC4To'+MnAp'C4'To'+Mn'ApC4'To'+Mn'Ap'C4To'$$

$$0Cr4=Mn'ApC4To'+MnAp'C4To'+MnApC4'To'+Mn'Ap'C4'To'$$

In accordance with the principles of the present invention, in order to provide two computations per step of the operation, there is provided the look-ahead comparison comprising a carry comparison logic 75$a$ and a borrow comparison logic 75$b$ collectively corresponding to the comparison device 75 illustrated in FIG. 6. This comparison logic operates during one word time to determine the nature of the second computation of the next word time. The nature of the second computation of such next word time depends of course upon the result of the first computation. However, a truth table can be set up in terms of the nature of the previous operation, the sign of the previous remainder, the divisor sign and the comparison of previous remainder with divisor to determine whether or not a carry or borrow will result. Such a truth table, as illustrated in FIG. 13, will yield sufficient information to enable the early determination of the required nature of the second computation of each word time.

For the purpose of setting up a truth table for the comparison operation, consider first a remainder which is positive and the algebraic addition thereto of a negative divisor. If a carry results it will be seen that the next remainder has a sign which is different from that of the divisor. Accordingly, addition is indicated. If no carry results, the remainder and divisor signs are the same whereby subtraction is indicated. Consider as a further example the subtraction of a negative divisor from a negative remainder. If an over-borrow results the sign of divisor and remainder are the same indicating subtraction is required whereas if no over-borrow results, the sign of divisor and remainder are different requiring addition. Corresponding conclusions may be drawn from consideration of the cases of adding a positive divisor to a negative remainder with or without carry and subtracting a positive divisor from a positive remainder with or without borrow. It will be noted that divisor and remainder are never of like sign when adding nor of a different sign when subtracting.

From such considerations, one may set up the truth table of FIG. 13 wherein the first column sets forth the nature of the previous operation which is, of course, indicated by the state of the first add-subtract indicator O2. The second column indicates the sign of the previous remainder which is found in $Cr4$ at $Tp$. The third column represents the divisor sign bit in C5 at $Tp$ while the fourth column represents whether or not a carry $Ob6$ or borrow $Ob4$ exists. A fifth column indicates the comparison of the divisor and new remainder to determine whether they are different or the same while the sixth column gives the desired add-subtract indication required by this look-ahead comparison to set the second add-subtract indicator C6. For example, if the previous operation was addition, and the previous remainder sign bit is zero indicating a positive remainder, the divisor sign bit is one indicating a negative divisor, and over-carry or over-borrow exists, it will be seen that the divisor and new remainder are of different signs requiring an addition operation.

The second add-subtract indicator C6 is set to zero (indicating addition) prior to each second computation whereby it is necessary to simply 1-set the C6 flip-flop only when subtraction is indicated. The existence of a carry, if any, is indicated in $Ob6$ by comparing the sign of the previous remainder in $Cr4$ (the second remainder of each) with the sign of the divisor in $Mn$ in an arrangement which utilizes only carry logic of addition. This logic is as follows:

$$1Ob6=Cr4MnDToxp'$$

where $$Toxp'=To'Tx'Tp'$$
$$0Ob6=Cr4'Mn'DTxp'+ToD$$

Since it is possible that a given operation of the second word time may also be subtraction, there is also provided a borrow comparison utilizing borrow logic of subtraction to provide an indication of an over-borrow, if any, in a flip-flop Ob4 by means of the following logic:

$$1Ob4=Cr4'MnDToxp'$$
$$0Ob4=Cr4Mn'DTxp'+ToD$$

Having determined Ob6 and Ob4 and knowing Cr4, O2 and C5 at bit time Tp of the given word time, we can write the logic for C6 from truth table of FIG. 13 as follows:

$$1C6=O2'Cr4'C5Ob6'Tp+O2'Cr4C5'Ob6Tp+O2Cr4C5Ob4Tp+O2Cr4'C5'Ob4Tp$$

With regard to the truth table it may be noted that the previous operation (O2) is never addition when the signs of the previous remainder (Cr4) and divisor (C5) are the same. So, too, the previous operation is never subtraction when the signs are different. With regard to the logic on C6, it will be noted that when the previous remainder is the same as the divisor in sign, we always add in the first operation of the word time controlled by flip-flop O2. That is, O2 is always false. Similarly, when the previous remainder sign is different than the divisor sign, subtraction is always the first operation of the word time controlled by flip-flop O2. Accordingly, only one of the terms Cr4 and O2 is needed in the logic on C6. Cr4 is chosen since it is available earlier than O2. This choice of earlier timing is needed for the round operation of the last word time. The logic on C6 then becomes $$1C6=Cr4'Ob6'C5Tp+Cr4Ob6C5'Tp+Cr4'Ob4'C5'Tp+Cr4Ob4C5Tp$$
$$0C6=Ts$$

Accordingly, it will be seen that the add-subtract flip-flop C6 for the second computation of each word time is 0-set at each Ts prior to the initiation of such second computation and then is 1-set if, at all, by the appropriate logic as is determined from the truth table from FIG. 13.

As noted previously, the two most significant bits remaining in the L register which are the next two most significant bits of the remainder, are copied into Ap at Tx and To respectively from Cr5. That one of these two bits from the L register which is of lesser significance is shifted into the A register through flip-flop Cr4 which copies Ap to To.

$$1Cr4=ApNc'DTo$$
$$0Cr4=Ap'DNc'To$$

Thus the second obtained remainder of a given word time appears in Cr4 and has appended to the low end thereof the next highest digit from the L register. This last-obtained remainder is then shifted through the A register where it appears in Al through As at Tx time as indicated in FIG. 10. The underlined bits in the A register in FIG. 10 indicate the eight most significant bits of each remainder at Tx time of the corresonding word time. The more significant group of underlined bits in the L register of FIG. 10 indicate those bits of the remainder which yet remain at the indicated Tx times in the L register. The underlined group of bits of lesser significance in FIG. 10 in the L register are the quotient bits as will be more particularly explained.

To continue the shift of the remainder through the A register, flip-flop Cr3 copies Cr4 and in turn is copied into As.

$$1Cr3=Cr4D$$
$$0Cr3=Cr4D$$
$$1As=Cr3Ob5Tox'$$
$$0As=Cr3'Ob5DTox'$$

For each word time except the first, the next two significant bits of the quotient are transferred into the L register by copying the states of the first and second add-subtract indicators O2 and C6. O2 is copied into Lx and C6 is copied into Lp at Tx bit times.

$$1Lp=C6Tx$$
$$0Lp=DTp$$

Thus, Lp is zeroed each Tp but the last and 1-set only if C6 is true.

$$1Lx=O2Tx$$
$$0Lx=O2'Tx$$

which sets the most significant quotient digit obtained during each step into the L register. These two quotient digits can be seen in L2 and L1, FIG. 10, at each succeeding Tx bit time together with the previously obtained quotient digit pair. For the remainder of the bit times other than Tx and Tp, the L register recirculates through the delay flip-flops Cr6 and Cr5 and through the quotient round-off logic comprising adder 104 which does not operate until the last word time.

Lp generally, except for the last word time, copies Lx, Cr6 copies Lp, Cr5 copies Cr6, and Ls copies Cr5.

$$1Cr6=LpD$$
$$0Cr6=Lp'D$$
$$1Cr5=Cr6D$$
$$0Cr5=Cr6'D$$
$$1Ls=Cr5DTo'$$
$$0Ls=Cr5'DTo'$$
$$1Lx=LoTx'$$
$$0Lx=Lo'Tx'$$

As previously described for the purposes of the combined one's to two's complement conversion and round operation, the least significant digit of the quotient will be augmented by a single unit if subtraction is indicated on the step following the last step which is actually taken in the division operation. Accordingly, there is provided the adder 104 which is employed during the last word time to add a single unit in a carry flip-flop C2 to the lowest order quotient digit which is in Lx at To. This one input adder 104 operates to reverse Lx bits as they are copied into Lp when the carry exists in flip-flop C2. The carry is turned on when subtraction is indicated by C6 true and is turned off at the first zero appearing in Lx. The one-input adder logic is as follows:

$$1Lp=Lx'C2Nc'Txp'+LxC2'Nc'Txp'$$
$$0Lp=LxC2Nc'Txp'+Lx'C2'Nc'Txp'$$
$$1C2=C6Ob5'TxIp'$$
$$0C2=D'Lx+Tp$$

It will be noted that the carried flip-flop C2 is zero throughout the operation (being zeroed a teach Tp) until it may be set at the last word time (indicated by D').

The term Ip' in the 1-set logic on C2 is the zero output of a round flip-flop (not shown) which is set false if the rounded quotient is desired and is true if rounded quotient is not needed, as in the case of double-length division where the adjusted remainder of one operation will be divided by the divisor.

For obtaining a properly modified remainder (without rounded quotient) having the sign of the divisor, the final step in the operation, if any computation is carried out at all, will comprise the addition of the divisor to the remainder in the same orders as were employed for the previous operation. For this reason there is required but a single bit shift in the penultimate step, word time 5. Accordingly, flip-flop Cr3 is removed from the A register loop and As copies Cr4 during the next to the last word time.

$$1As=Cr4\ Ob5'\ D\ Tx'$$
$$0As=Cr4'\ Ob5'\ D\ To'$$

where Ob5′ D indicates the next to the last word time as can be seen from the chart of FIG. 9a and 9b.

For the purpose of the unique handling of the last step of the operation which will provide an adjusted remainder having the same sign as the divisor, the first add-subtract logic 76 is set to add (note that there has been no shift) the divisor back to the last-obtained remainder if and only if the signs of the divisor and such last-obtained remainder are different. If the signs are the same, no operation at all is carried out by this or any other add-subtract logic during the last word time. In the latter situation, the last-obtained remainder of word time 5 comprises the resulting remainder of the entire computation.

This unique operation of the first add-subtract logic is achieved by the logic on Mn which has been set forth previously. Note that Mn is 1-set by No true only when D is true which is during all but the last word times. Because of the gate No O2′ Txp′ on the 1-set side of Mn, this flip-flop Mn can be 1-set during the last word time if and only if the first add-subtract indicator O2 is false, indicating addition. If O2 is true, Mn which is zeroed at each Tx time remains zero for the entire last word time. When Mn is zero, the add-subtract logic in effect adds or subtracts zero which is a "do nothing" operation.

During the last word time the quotient which has been accumulating in the L register is transferred into the A register via the C4 flip-flop which is no longer needed as carry-borrow flip-flop. In the illustrated computation, the quotient 01100010 appears in the A register at the final Tx (see FIG. 10) while the zero remainder appears in Ll through Ls of the L register.

$1C4=LpD'To'$
$0C4=Lp'D'$
$1As=C4D'To'$
$0As=C4'D'To'$

To ensure the proper setting of flip-flop Ap for succeeding operations of which a description is not needed for an understanding of the present invention, flip-flop Ap is caused to copy C4 at the end of the last word time by the following logic:

$1Ap=C4D'Tp$
$0Ap=C4'D'Tp$

The remainder which appears in the last word time in the Ap flip-flop is transferred to the L register by $1Ls=ApD'To'$
$0Ls=Ap'D'To'$ The last bit in Ap is copied into Lp at Tp bit time by $1Lp=ApD'Tp$
$0Lp=Ap'D'Tp$ With the disclosed embodiment of this division apparatus, an over-flow is possible as previously described if the divisor is smaller than the remainder. If an overflow occurs it is necessary to provide some indication which is achieved in this machine by the use of an over-flow flip-flop, Of (not shown). The existence of an over-flow is determined by checking the first two bits (over-flow check bit and quotient sign bit respectively) of the quotient which appear in positions Lx and Lp at bit time Ts of the last word time. The over-flow check bit first appears in Lx which copies O2 at Tx of the first word time while the quotient sign bit first appears in Lp which copies C6 at Tx of the first word time. If these two bits are the same, over-flow has occurred. Thus the over-flow flip-flop, initially set to zero, has the following logic:

$$1Of=LxLpD'Ts+Lx'Lp'D'Ts$$

There has been described an apparatus for performing rapid division in serial fashion by operations upon both positive and negative numbers and by performing two computations, two additions or subtractions, for each step of the division. For the purposes of providing an indication of the nature of the second computation of each step of the division, the machine embodies a look-ahead comparison arrangement which will determine whether addition or subtraction is required in the second computation of each word time. This look-ahead comparison arrangement is also employed during the last step of the computation to achieve an improved rounding of the quotient without taking an additional word time to determine the nature of the next quotient digit. A simplified handling of double-length division is also available by adjustment of the remainder.

The following comprises a collection of the logical equations which describe the embodiment of the invention disclosed herein.

$1Ak=MnAxO2'Tox'+MnAx'O2Tox'$
$0Ak=Tx+Mn'Ax'O2'+Mn'AxO2$
$1Ap=MnAxAkTox'+MnAx'Ak'Tox'+Mn'AxAk'Tox'$
$\quad +Mn'Ax'AkTox'+Cr5DTox+C4D'Tp$
$0Ap=D'To+MnAxAk'Tox'+MnAx'AkTox'$
$\quad +Mn'AxAkTox'+Mn'Ax'Ak'Tox'+Cr5'DTox$
$\quad +Cr4'D'Tp$
$1As=Cr3Ob5DTox'+Cr4Ob5'DTx'+C4D'To'$
$0As=Cr3'Ob5DTox'+Cr4'Ob5'DTo'+C4'D'To'$
$1C2=C6Ob5'TxIp'$
$0C2=D'Lx+Tp$
$1C4=MnApC6'Tox'+MnAp'C6Tox'+LpD'To'$
$0C4=Mn'Ap'C6'Tx'+Mn'ApC6Tx'+McTo+Lp'D'$
$1C5=MnTs$
$0C5=Mn'Ts$
$1C6=Cr4'Ob6'C5Tp+Cr4Ob6C5'Tp$
$\quad +Cr4'Ob4'C5'Tp+Cr4Ob4C5Tp$
$0C6=Ts$
$1Cr3=Cr4D$
$0Cr3=Cr4'D$
$1Cr4=MnApC4To'+MnAp'C4'To'+Mn'ApC4'To'$
$\quad +Mn'Ap'C4To'+ApNc'DTo$
$0Cr4=Mn'ApC4To'+MnAp'C4To'+MnApC4'To'$
$\quad +Mn'Ap'C4'To'+Ap'DNc'To$
$1Cr5=Cr6D+AoNc+Cr6D$
$0Cr5=Cr6'D+Ao'Nc+Cr6'D$
$1Cr6=LpD$
$0Cr6=Lp'D$
$0D=Ob5Tx$
$1Lp=LxNcTxp'+C6Tx+Lx'C2Nc'Txp'$
$\quad +LxC2'Nc'Txp'+ApD'Tp$
$0Lp=Lx'NcTxp'+DTp+LxC2Nc'Txp'$
$\quad +Lx'C2'Nc'Txp'+Ap'D'Tp$
$1Ls=Cr5DTo'+ApD'To'$
$0Ls=Cr5'DTo'+Ap'D'To'$
$1Lx=LoTx'+O2Tx$
$0Lx=Lo'Tx'+O2'Tx$
$1Mc=Nd'Tx$
$0Mc=Tp$
$1Mn=NoD\,Txp'+NoO2'Txp'$
$0Mn=No'Tp'+Tx$
$1Nc=Nd$
$0Nc=NcTx$
$1ND=\text{command}$
$0Nd=NdTx$
$1Np=NxNc'Top'$
$0Np=Nx'Nc'Top'$
$1O2=C5Cr4Tp+C5'Cr4'Tp$
$0O2=DTs$
$1Ob4=Cr4'MnDToxp'$
$0Ob4=Cr4Mn'DTxp'+ToD$
$0Ob5=Ob3Tp$
$1Ob6=Cr4MnDToxp'$
$0Ob6=Cr4'Mn'DTxp'+ToD$
$1Of=LxLpD'Ts+Lx'Lp'D'Ts$
$Top'=To'Tp'$
$Tox'=To'Tx'$
$Txp'=Tx'Tp'$
$Toxp'=To'Tx'Tp'$

I claim:

1. In a serial computer embodying cyclically circulating number storage registers for performing non-restoring division of a dividend by a divisor during a plurality of word times each comprising a synchronized recirculation cycle of the registers, first means for additively or subtractively combining the divisor with the dividend during one cycle and with a previously obtained second remainder during subsequent cycles to obtain a first remainder for each cycle, first indicator means responsive to the sign of said second remainder of each cycle and the sign of said divisor for selecting either additive or subtractive combining by said first means in order to produce a quotient digit, second means for additively or subtractively combining the divisor with each first remainder of a cycle to produce a less significant quotient digit and obtain a second remainder for each cycle, and means operable during one cycle for selecting either additive or subtractive combining by said second combining means in the next cycle.

2. In a serial computer embodying cyclically circulating number storage registers for performing non-restoring division of a dividend by a divisor during a plurality of word times, each comprising a synchronized recirculation cycle of the registers, first means for additively or subtractively combining the divisor with the dividend during one cycle and with a previously obtained second remainder during subsequent cycles to obtain a first remainder for each cycle, first indicator means responsive to the sign of said dividend during said one cycle or to the sign of said second remainder during subsequent cycles and the sign of the divisor for selecting either an additive or subtractive combining by said first means, second means for additively or subtractively combining the divisor with a first remainder of each cycle to obtain a second remainder for each cycle, and second indicator means responsive to a comparison of a carry or borrow of the second computation of a previous cycle with the signs of the second remainder of the previous cycle and the divisor for selecting each additive or subtractive combining by said second means.

3. In an apparatus for effecting step-by-step division of a dividend by a divisor to obtain a number of successive remainders and a quotient containing digits determined by the operations performed in different steps of the division, one quotient digit for each step; means for rounding the quotient comprising look-ahead means operable during the step preceding the step in which the least significant quotient digit is determined for comparing a carry or borrow produced in said preceding step with the signs of the divisor and the remainder obtained during said preceding step to indicate the quotient digit which would be computed by yet a further step of the division after the last for the least significant quotient digit, and means responsive to said comparing means for selectively combining one unit with the least significant digit of the quotient.

4. In computing apparatus for performing step-by-step non-restoring division of a dividend by a divisor to obtain a quotient, means for obtaining a plurality of successive remainders in each of a number of successive cycles of the division by a plurality of successive computations each comprising either addition or subtraction of the divisor to or from successive remainders, each said computation determining a digit of the quotient, means responsive to the last obtained remainder of one cycle for selecting the nature of the first computation of the next cycle, and means for comparing a carry or borrow from the last computation of one cycle with the sign of the divisor and the sign of the last obtained remainder of the one cycle and selecting, according to such comparison, the nature of the second computation of the next cycle.

5. In computing apparatus for performing step-by-step non-restoring division of a positive or negative dividend by a positive or negative divisor to obtain a quotient, and where negative numbers are represented in two's complement, means for obtaining a plurality of successive remainders in each of a number of successive cycles of the division by a plurality of successive computations comprising either addition or subtraction of the divisor to or from successive remainders, each said computation determining a digit of the quotient, means responsive to the signs of the divisor and of the last obtained remainder of one cycle for selecting the nature of the first computation of the next cycle, means for comparing a carry or borrow from the last computation of one cycle with the signs of the divisor and the last obtained remainder of one cycle and selecting, according to such comparison, the nature of the second computation of the next cycle, and means responsive to operation of said comparing means during the penultimate cycle of the division for rounding the quotient and converting it to two's complement when negative during the ultimate cycle.

6. In a serial binary computer wherein negative numbers are represented in two's complement, apparatus for dividing a positive or negative dividend by a positive or negative divisor to obtain a positive or negative quotient and a true remainder having the same sign as the divisor, comprising an indicator, means controlled by said indicator for additively or subtractively combining the divisor with the dividend and with successively obtained remainders to successively obtain a new remainder for each such combination, means for setting said indicator to control subtractive combination when the sign of the dividend or previously obtained remainder is like that of the divisor and setting said indicator to control additive combination when the sign of the dividend or previously obtained remainder is unlike that of the divisor, means for shifting the divisor relative to the remainder for each additive or subtractive combining but the last, and means for disabling the final combination performed by said combining means only if subtraction is indicated, thereby providing an adjusted final remainder having the same sign as the divisor.

7. In a serial binary computer wherein negative numbers are represented in two's complement, apparatus for dividing a positive or negative dividend by a positive or negative divisor to obtain a positive or negative quotient and a remainder comprising a first indicator, first add-subtract means controlled by said indicator for additively or subtractively combining the divisor with the dividend and with successively obtained remainders (obtained by second add-subtract means) to successively obtain a new remainder for each such combination, means for setting said indicator to control subtractive combination when the sign of the dividend or previously obtained remainder is like that of the divisor and setting said indicator to control additive combination when the sign of the dividend or previously obtained remainder is unlike that of the divisor, a second indicator, second add-subtract means controlled by said second indicator for additively or subtractively combining the divisor with the remainder obtained by said first add-subtract means, means responsive to comparison of the divisor and its sign with the remainder obtained by the second add-subtract means and its sign for setting the second indicator to control addition or subtraction, and means for shifting the divisor relative to the remainder for each combination but the last.

8. The computer of claim 7 including means for disabling said first add-subtract means after the last operation of said second add-subtract means only if said first indicator is set to control subtraction.

9. The computer of claim 7 wherein a negative quotient is obtained in one's complement and including means for augmenting the lowest order of the quotient by one when the last setting of the second indicator is such as to control subtraction.

10. A serial binary divider comprising a first circulating register for storing a divisor, a second circulating register for storing a dividend and storing successive remainders resulting from additions or subtractions performed with the contents of the second register, timing means for counting a predetermined number of word times each corresponding to a complete circulation cycle of said registers, a first add-subtract indicator, means for causing said indicator to have one state when the number in said second register has one sign and to have another state when the number has another sign, a first adder-subtractor controlled by said first indicator for either adding or subtracting the number in said first register to or from the number in said second register and storing the result as part of a first new remainder of a word time, a second add-subtract indicator, a second adder-subtractor controlled by said second indicator for either adding or subtracting the number in said first register to or from said new remainder of a word time and storing the result as a part of a second remainder obtained during a word time, an add-subtract comparator for additively and subtractively comparing the number in said first register with said second remainder obtained during a word time, means for setting said second indicator to control either addition or subtraction in response to said comparator, and means for causing the contents of said second register to precess left by two digit positions during word times other than the last two and for causing but a single digit precession of said second register during the next to the last word time.

11. The divider of claim 10 including means for controlling the first adder-subtractor during the last word time to effect only addition, if indicated by the first indicator, of the divisor to the last obtained remainder to obtain a conditionally modified remainder having the sign of the divisor.

12. A serial binary divider operable upon both negative and positive numbers wherein negative numbers are represented by two's complement comprising a first circulating register for storing a divisor of positive or negative sign, a second circulating register for storing the more significant half of a positive or negative dividend, and having first and second highest order positions for storing successive remainders of either positive or negative sign resulting from additions or subtractions performed with the contents of the second register, a third circulating register for storing the less significant half of the dividend, timing means for counting a predetermined number of word times each corresponding to a complete circulation cycle of said registers, a first add-subtract indicator, means for causing said indicator to have one state when the signs of the numbers in said first and second registers are alike and to have another state when such signs are unlike a first adder-subtractor controlled by said first indicator for either adding or subtracting digits circulated through the low end of said first register to or from digits circulated through the low end of said second register and storing the result in said highest order position as part of a first new remainder of a word time, a second add-subtract indicator, a second adder-subtractor controlled by said second indicator for either adding or subtracting digits circulated through the low end of said first register to or from the new remainder digits stored in said highest order position and storing the result in said second highest order position as a part of a second remainder obtained during a word time, an add-subtract comparator for additively and subtractively comparing the digits circulated through the low end of said first register with the digits stored in said second highest order position, means for setting said second indicator to control either addition or subtraction in response to said comparator and the signs of both divisor and dividend or first new remainder of each word time, means for causing the contents of said second and third registers to precess left by two digit positions during word times other than the last two and for causing but a single digit precession of said second register during the next to the last word time, means for inserting into the two lowest order digit positions of said third register quotient digits respectively represented by states of said second and first add-subtract indicators, and means for appending the two most significant remainder digits from the third register to the least significant end of each first and second remainder part respectively.

13. The divider of claim 12 including a one-input adder selectively responsive to the last obtained indication of said second add-subtract indicator for adding one to the lowest order quotient digit in said third register to both round the quotient and convert it to two's complement form if necessary.

14. The divider of claim 13 including a selectively operable one-input adder responsive solely to a subtract setting of said second add-subtract indicator for adding one to the lowest order quotient digit in said third register to both round the quotient and convert it to two's complement form if the quotient is negative, and means for controlling the first adder-subtractor during the last word time to effect only addition, if indicated by the first indicator, of the divisor to the last obtained remainder to obtain a remainder having the sign of the divisor if operation of the one-input adder is not selected.

15. A digital computer for division comprising means for registering a divisor, means for registering a dividend, means for obtaining two successive remainders and quotient digits for each pair of computations during each cycle of the division but the first and last by either adding or subtracting the divisor to or from each of two successive remainders obtained during successive computations, first indicator means responsive to the signs of the divisor and the last of two successive remainders obtained during a given division cycle for determining whether the divisor is to be added or subtracted from such last obtained remainder during the first computation of the next cycle, second indicator means responsive to a comparison of a carry or borrow of the second computation of a preceding cycle with the signs of the remainder from the second computation of the preceding cycle and the divisor for determining whether the divisor is to be added to or subtracted from the first remainder obtained during the first computation of the next cycle, and means for shifting the divisor relative to the remainder after each computation of each cycle except the last cycle.

16. The apparatus of claim 15 including means operable only during the last cycle to add the divisor to the last obtained remainder in response to said first indicator means to provide an adjusted remainder having the same sign as the divisor.

17. The apparatus of claim 15 including round-off means responsive to said second indicator means for augmenting the least significant quotient digit by one during the last division cycle only if the next least significant quotient digit produced in response to said second indicator means is equal to one.

References Cited by the Examiner

UNITED STATES PATENTS

| | | | |
|---|---|---|---|
| 2,999,636 | 9/1961 | Hogan | 235—167 |
| 3,023,961 | 3/1962 | Stafford | 235—164 |
| 3,023,962 | 3/1962 | Stafford | 235—164 |
| 3,033,457 | 5/1962 | Strachey | 235—165 |
| 3,070,304 | 12/1962 | Amdahl et al. | 235—167 |

ROBERT C. BAILEY, *Primary Examiner.*

MALCOLM A. MORRISON, *Examiner.*